United States Patent
Sandgren et al.

(10) Patent No.: US 12,022,415 B2
(45) Date of Patent: Jun. 25, 2024

(54) METHODS TO MONITOR, CONFIGURE, MANAGE AND SIGNAL SYNCHRONIZATION FOR INTEGRATED ACCESS BACKHAUL (IAB) LINKS

(71) Applicant: TELEFONAKTIEBOLAGET LM ERICSSON (PUBL), Stockholm (SE)

(72) Inventors: Magnus Sandgren, Staffanstorp (SE); Muhammad Kazmi, Sundbyberg (SE); Chunhui Zhang, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 426 days.

(21) Appl. No.: 17/604,067

(22) PCT Filed: May 4, 2020

(86) PCT No.: PCT/IB2020/054221
§ 371 (c)(1),
(2) Date: Oct. 15, 2021

(87) PCT Pub. No.: WO2020/225713
PCT Pub. Date: Nov. 12, 2020

(65) Prior Publication Data
US 2022/0232494 A1   Jul. 21, 2022

Related U.S. Application Data

(60) Provisional application No. 63/007,656, filed on Apr. 9, 2020, provisional application No. 62/843,028, filed on May 3, 2019.

(51) Int. Cl.
*H04W 56/00* (2009.01)
(52) U.S. Cl.
CPC ................ *H04W 56/001* (2013.01)
(58) Field of Classification Search
CPC ........... H04W 56/001; H04W 56/0025; H04W 16/32; H04W 72/27; H04W 24/10
See application file for complete search history.

(56) References Cited

U.S. PATENT DOCUMENTS

2019/0109745 A1*   4/2019   Abedini ............... H04L 5/0053

OTHER PUBLICATIONS

ISR and WO for PCTIB2020054221.
3GPP TSG RAN WG1 #97, "Mechanism to support the "case-1" OTA timing alignment", Source:NTT Docomo, Inc., R1-1906204, Reno, US, May 13-17, 2019, pp. 1-3.

* cited by examiner

*Primary Examiner* — Thai Nguyen
(74) *Attorney, Agent, or Firm* — Sage Patent Group

(57) ABSTRACT

There is provided a method for determining and sharing a synchronization accuracy/error for a number of IAB nodes in a chain of IAB nodes communicatively coupled to each other. The method comprises: receiving from each IAB node in the chain of IAB nodes, information about a synchronization error for each IAB node; and reporting an accumulated synchronization error to the respective IAB nodes in the chain of IAB nodes, in response to receiving the information about the synchronization error for each IAB node.

20 Claims, 16 Drawing Sheets

METHODS TO MONITOR, CONFIGURE, MANAGE AND SIGNAL SYNCHRONIZATION FOR INTEGRATED ACCESS BACKHAUL (IAB) LINKS

RELATED APPLICATIONS

The application claims the benefits of priority of U.S. Provisional Patent Application No. 62/843,028, entitled "Methods to monitor, configure and manage synchronization for integrated access backhaul (IAB) links" and filed at the United States Patent and Trademark Office (USPTO) on May 3, 2019, the content of which is incorporated herein by reference. The application also claims the benefits of priority of U.S. Provisional Patent Application No. 63/007,656, entitled "Methods for signaling synchronization status between integrated access backhaul (IAB) nodes" and filed at the USPTO on Apr. 9, 2020, the content of which is incorporated herein by reference.

BACKGROUND

Base stations generally have a very good perception of time, e.g. through synchronization towards Global Navigation Satellite System (GNSS).

Many base stations are stationary and could have a clear view of sky and thereby have the possibility to receive and integrate GNSS signals over time to achieve a very good timing accuracy. Base stations lacking a clear view of sky could receive good timing distributed e.g. through Precision Timing Protocol (PTP) protocol from a GNSS receiver at a different location.

A base station generally uses an oscillator with good frequency stability to keep track of time between time synchronization events. This is to allow continuous operation for many network features like for Time Division Duplexing (TDD). In New Radio (NR), the cell phase synchronization accuracy for TDD is in Third Generation Partnership Project (3GPP) Technical Specification (TS) 38.133 V15.5.0 specified as "The cell phase synchronization accuracy measured at BS antenna connectors shall be better than 3 µs". In practice, this is equally distributed between the base station (BS) as ±1.5 µs towards a common reference like Global Positioning System (GPS) time. Other services could have more strict requirements like Observed Time Difference of Arrival (OTDOA) or intra cell Coordinated Multi-Point (CoMP).

A BS or any radio node (e.g. Integrated Access and Backhaul (IAB) node) is considered to be in holdover state or mode, if it cannot acquire time synchronization from the synchronization source, e.g. due to jamming or disruption of the synchronization source, such as GNSS. The duration over which the radio node is in holdover state is called as holdover period. During the holdover period, the radio node may use its internal clock to maintain the timing. The good frequency stability of the oscillator is essential to maintain BS timing, even if there is a temporary loss of its synchronization source during the holdover operation. Hence, the BS normally operates well below the required synchronization accuracy as seen in FIG. 1, which illustrates BS synchronization levels. The holdover margin ($T_{hold}$) is essential for high BS availability. The larger the holdover margin ($T_{hold}$), the longer the BS can continue normal operation. The sync source input error ($T_{syncS}$) and BS internal errors ($T_{syncS-gNB}$) reduce the holdover margin.

A reduced holdover margin can be compensated by a more expensive oscillator. However, in this case, oscillator cost generally increases significantly and can become very high.

In 3GPP, there are an ongoing Work Item (WI) for IAB based on earlier study item documented in 3GPP TR 38.874 (e.g. V16.0.0). The purpose of IAB is to replace a wired backhaul with a wireless backhaul. This is generally to reduce the cost for a wired backhaul, which in certain deployments could impose a large cost for the installation and operation of the BS.

The Donor node (e.g. donor IAB node) is the only node connected to a wired backhaul. Each IAB node in the chain of nodes acts as a child node towards upstream IAB node and parent towards downstream IAB node.

A child node retrieves its synchronization from its parent node (or Donor node) through Over The Air Synchronization (OTA-S), i.e. by receiving timing signals from the parent node timing signals and synchronizing its transmission timing towards the received timing. Examples of signals that can be used for acquiring timing are any type of reference signals transmitted by the donor or parent node. Examples of reference signals are signals in synchronization signal block (SSB) (e.g. PSS, SSS, PBCH DMRS, etc.), CSI-RS, etc. For accurate synchronization, the child node also needs to compensate for the Radio Frequency (RF) propagation time between parent and child nodes.

Hence, the OTA-S timing error consists of two parts and related error sources:
1. Parent-child link timings
   a. IAB child node downlink (DL) receive (RX) tracking (received parent node DL @IAB node)
   b. Translating IAB child DL RX to transmit (TX) (either for backhaul towards parent or when acting as parent towards other IAB node)
2. One-way RF propagation delay compensation The total OTA-S timing errors are here called ($T_{OTA-S}$). The OTA-S capability is mainly a function of the child node but also a strong function of RF link characteristics. A simplified time stamp accuracy model below shows dependencies towards Signal to Noise Ratio (SNR) and bandwidth (BW) but reference signal characteristics also matter.

$$\sigma \propto \frac{1}{\sqrt{\text{Total } SNR \times BW}}$$

Where σ is the standard deviation in a normal distribution.

For both link timings (#1 above) and RF delay compensation (#2 above), more assigned reference signals and repetition over time will reduce random statistical errors, since they will be averaged out, i.e. OTA-S can be improved at expense of sacrificing RF resources. Since the RF channel is often considered static for stationary IAB nodes, resources spent at commission of system would generally not cause any significant overhead.

The timing errors accumulate over an increasing number of hops (N), see FIG. 2 (which illustrates IAB synchronization), and, at the last node, the total accumulated synchronization error can be expressed by the following equation (±1.5 µs for mandatory TDD cell phase sync): $T_{syncS}$+ $T_{hold\_N}$+$T_{syncS-gNB}$+$T_{OTA-S\_1}$+$T_{OTA-S\_2}$+ . . . +$T_{OTA-S\_N}$+ ≤±1.5 µs, where N is the number OTA-S links (N=4 in FIG. 2), $T_{hold\_N}$ is the holdover margin at the last node (N).

One clear effect is that, depending on where in the chain an IAB node will operate at, there are different synchronization accuracies and hence different holdover margins. This is shown in FIG. 3, which illustrates the holdover margin at different IAB nodes.

If there are too many nodes (high N), the large contribution from OTA-S would mean low holdover margin, thereby lowering availability of nodes further down in the chain To some extent this could be compensated by using a more expensive oscillator (unfortunately cost increase is not linear), or more redundant and stricter synchronization sources at a Donor node input, which also could add to the cost of deployment significantly; this would be counterproductive, since one purpose with IAB nodes was to reduce cost.

In addition to OTA-S, an IAB can be implemented using its own local synchronization source like GNSS, as both absolute timing and frequency reference, i.e. independent from its parent node synchronization. According to 3GPP decision in R1-1913275, an IAB node can be synchronized with a separate synchronization source (i.e. GNSS): "An IAB node with multiple parents treats each parent as a separate synchronization source. The IAB node can also treat RAT-independent sources such as GNSS (if used) as a separate synchronization source."

In addition to timing errors, the IAB nodes, to access links, need to fulfill BS class specified frequency errors as shown below according to 3GPP agreement (R4-2002496):

TABLE 6.5.1.2-1

Frequency error minimum requirement

| BS class | Accuracy |
|---|---|
| Wide Area BS | ±0.05 ppm |
| Medium Range BS | ±0.1 ppm |
| Local Area BS | ±0.1 ppm |

There currently exist certain challenge(s) and problems.

Problem 1—Sharing of Synchronization Status Among IAB Nodes

Each IAB node in a chain of IAB nodes does not know:
1. What input synchronization accuracy it has in a complete accumulated budget during normal operation (dependent on donor node initial synchronization error, its position in chain and number of hops, and OTA-S performance in previous nodes), and
2. If the Donor node is in holdover and therefore an estimated degradation in their own synchronization accuracy over time (and thereby when it reaches critical limits like TDD cell phase sync requirements).

Since an IAB node may not be aware of its synchronization accuracy, this might lead to either the IAB node turning off too early or the IAB node's continuous operation, even if it does not fulfill standardized synchronization requirement(s), like TDD cell phase sync and thereby causing interference to other systems.

The Donor node does not know the OTA-S performance in downstream IAB parent-child links, individual IAB nodes critical synchronization accuracy limits (dependent services supported), and thereby it is unaware of individual synchronization accuracies and margins towards their supported services.

Since the donor node does not know the overall status of its downstream IAB nodes, it cannot act as an anchor node to supervise, coordinate, e.g., mitigation related actions or graceful degradations. Since the IAB nodes lack a wired backhaul as for a traditional BS, new over the air signaling is needed.

Problem 2—Coordinated Mitigation Methods for Prolonged Holdover (Increased Availability) and Graceful Degradation Since none of the nodes in the IAB chain has the complete synchronization overview, it is not possible to know when and what mitigation methods can and would be efficient, for a more prolonged operation or graceful degradation of the system.

Problem 3—Using IAB-Mobile Termination (MT) as a Synchronization Source for the IAB Node As an IAB-Distributed Unit (DU) may have tighter absolute frequency error requirement than an IAB-MT within the same node, when the IAB-MT, acting as a synchronization source for the IAB DU in a child IAB node and locking its time and frequency towards its parent IAB node, the time or frequency error of a child IAB could exceed the 3GPP specification, when the parent IAB enters the holdover and has changed its synchronization status from lock to unlock. For example, the frequency error requirement for the IAB-MT might be relative to the parent frequency, if the parent node exceeds a certain absolute frequency during holdover, by an error of e.g. +/−50 ppb. And the child IAB-MT has a relative allowed tracking error of +/−100 ppb towards the parent node, the child IAB-DU will exceed the BS class +/−100 ppb absolute frequency error (it will become +/−150 ppb).

Problem 4—Using Local Sync Source for an IAB Node

If an IAB node is using a local sync source (e.g. GNSS) for its absolute time and frequency reference, the relative frequency error between the IAB-MT towards its upstream node depends on both the absolute frequency error of the IAB-MT and the absolute frequency error of the upstream parent node (master of the link). During normal operation, the absolute frequency error is small, when the nodes are synchronized and generally far more accurate than the allowed specified 3GPP BS class accuracies. However, if either node is in holdover and has lost its synchronization source, the absolute frequency will depend on the performance of the internal oscillator and there will be a risk that the relative frequency error will exceed the 3GPP specification error/accuracy.

SUMMARY

Certain aspects of the present disclosure and their embodiments may provide solutions to the aforementioned or other challenges.

Embodiments provide a method for over the air signaling, with sharing of IAB related synchronization parameters/errors to secure fulfillment of the synchronization requirements at each IAB node. The following parameters may be shared:
Estimated OTA-S synchronization errors for individual parent-child links;
Estimated accumulated synchronization accuracy/error at each node;
Estimated synchronization margin at each node.

In some examples, distribution of each node's synchronization information is done in a centralized way or distributed way.

For example, the embodiments may allow for exchanging the synchronization information for multiple hop IAB nodes in a distributed way, where each IAB node reports the accumulated sync errors to the other IAB node downstream in the chain of IAB nodes. The reports can be done periodically or triggered by event (i.e. a node lost the synchronization source). Furthermore, methods of preventing a child IAB node from generating interference to other network nodes, when the time and frequency error specified in 3GPP is about to be violated, are also disclosed herein.

In some examples, sharing information is also a prerequisite and basis to timely launch various mitigation methods to allow continuous operation even during e.g. holdover operation.

Furthermore, inter IAB node coordinated mitigation methods for prolonged holdover (increased availability) and graceful degradation are also described in this disclosure.

According to an aspect, there is provided a method performed by a network node/IAB node for determining and sharing synchronization error/accuracy. The method may comprise: receiving, from each IAB node in the chain of IAB nodes, information about a synchronization error for each IAB node about a synchronization error for each IAB node; and reporting an accumulated synchronization error to the respective IAB nodes in the chain of IAB nodes, in response to receiving the information about the synchronization error for each IAB node.

According to another aspect, there is provide a method in an IAB node. The method comprises: sending to the donor IAB node, information about a synchronization error; and receiving an accumulated synchronization error for the IAB node, the accumulated synchronization error being based on at least the sent synchronization error.

According to another aspect, there is provide a method in an IAB node. The method comprises receiving a first synchronization report from a parent IAB node in the chain of IAB nodes; sending a second synchronization report to a child IAB node in the chain of IAB nodes, the second synchronization report comprising at least the first synchronization report and a synchronization error.

Some embodiments include a network node/IAB node configured, or operable, to perform one or more functionalities/methods (e.g. operations, steps, etc.) as described herein.

In some embodiments, the network node may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

In some embodiments, the network node may comprise one or more functional modules configured to perform one or more functionalities as described herein.

According to another aspect, some embodiments include a non-transitory computer-readable medium storing a computer program product comprising instructions which, upon being executed by processing circuitry (e.g., at least one processor) of the network node or IAB node, configure the processing circuitry to perform one or more functionalities as described herein.

Certain embodiments may provide one or more of the following technical advantage(s). An IAB node is made aware of its synchronization accuracy. This is beneficial since an IAB node not being aware of its synchronization accuracy might lead to either the IAB node turning off too early or the IAB node's continuous operation even if it does not fulfill standardized synchronization requirement(s) (e.g., TDD cell phase sync).

A donor node can know an overall status of its downstream nodes. This is beneficial since, if the donor node does not know the overall status of its downstream IAB nodes, it cannot act as an anchor node to supervise, coordinate for a safe normal operation or e.g. mitigation actions related to prolonged operation or graceful degradations during holdover operation.

Since IAB nodes lacks a wired backhaul as for traditional BS, embodiments described herein provide new over the air signaling.

BRIEF DESCRIPTION OF THE DRAWINGS

Exemplary embodiments will be described in more detail with reference to the following figures, in which.

DETAILED DESCRIPTION

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Note that the description given herein focuses on a 3GPP cellular communications system and, as such, 3GPP terminology or terminology similar to 3GPP terminology is oftentimes used. However, the concepts disclosed herein are not limited to a 3GPP system.

Figure 1:
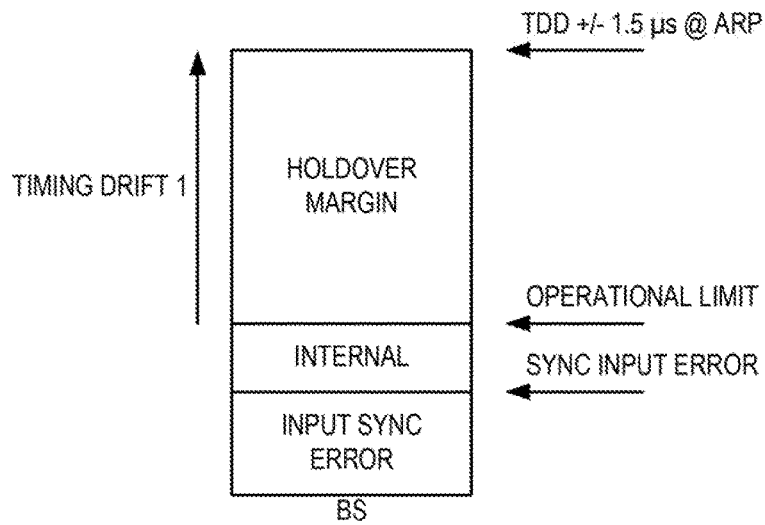
FIG. 1 illustrates different synchronization levels for a base station.
Figure 3:
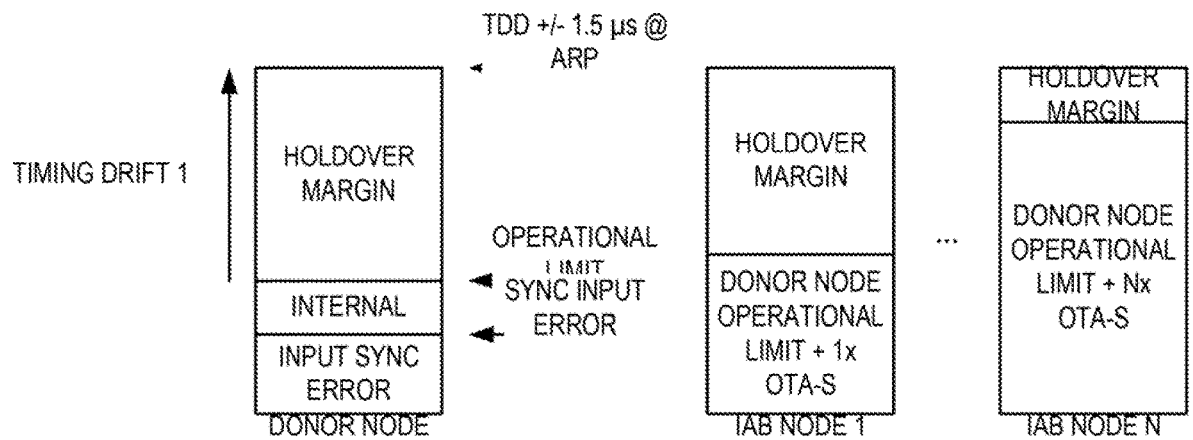
FIG. 3 illustrates holdover margins in IAB nodes.
Figure 4:
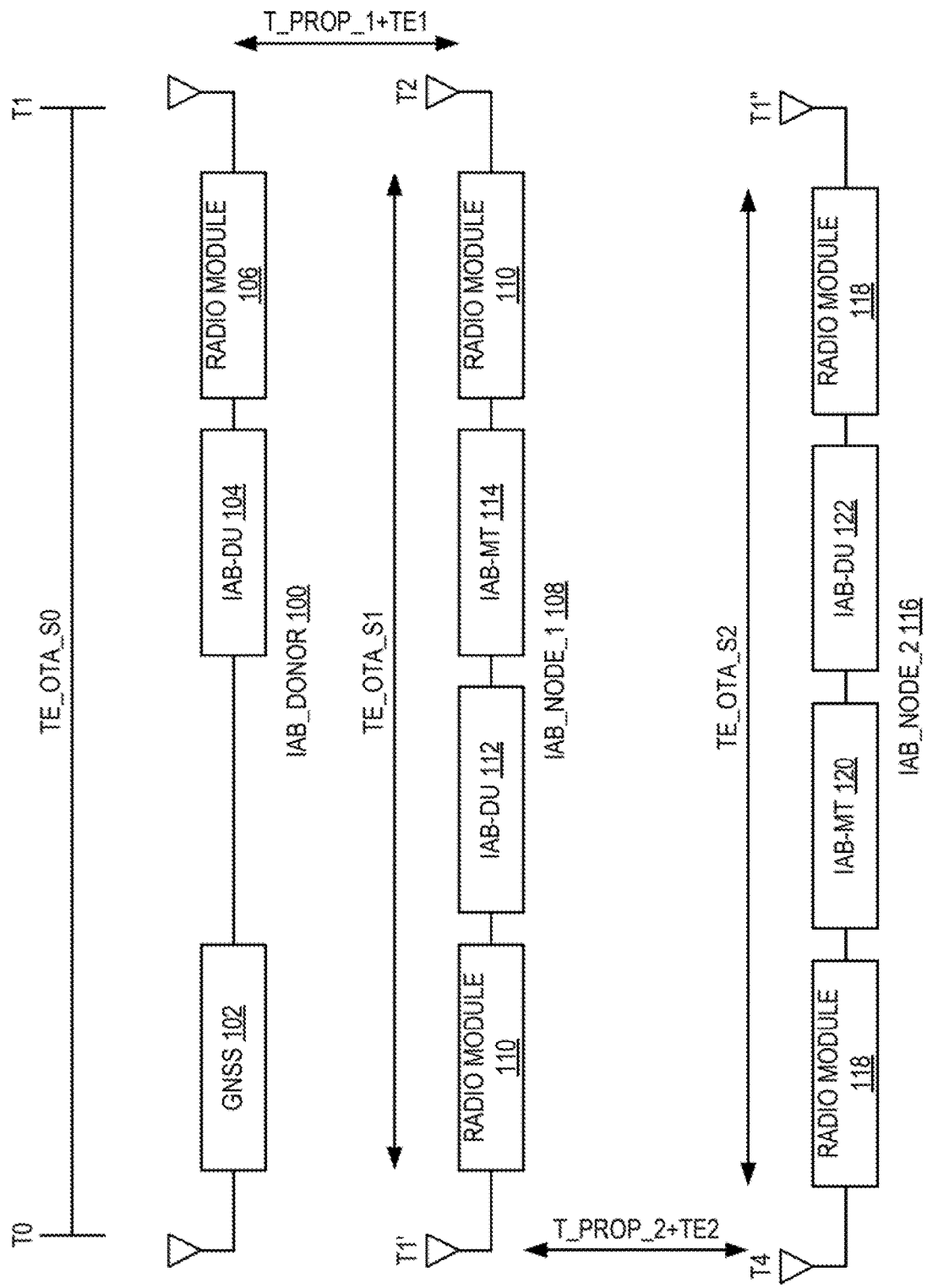
FIG. 4 illustrates an air time relation with the internal time error and estimated propagation time error in a multiple hop chain of IAB nodes.

FIG. 4 illustrates a multiple hop IAB node air time relation with the internal time error and estimated propagation time error. As illustrated, in this example, the IAB Donor 100 includes a GNSS 102 (e.g., GPS receiver), an IAB Distributed Unit (IAB-DU) 104, and a radio module 106. Each IAB node (e.g., IAB1 108 which is denoted in FIG. 1 as IAB_Node_1 and IAB2 which is denoted in FIG. 4 as IAB_Node_2) includes a radio module 110, an IAB-DU 112, and an IAB-MT 114 for IAB node 108 and module 118, an IAB-DU 122, and an IAB-MT 120 respectively In FIG. 4, the OTA-S timing error (related to T1, T1' and T1") consists of two parts:
1. Parent-child link internal time error: TE_OTA_S1 or TE_OTA_S2
2. One-way RF propagation delay estimation error: TE1 or TE2

Figure 5:
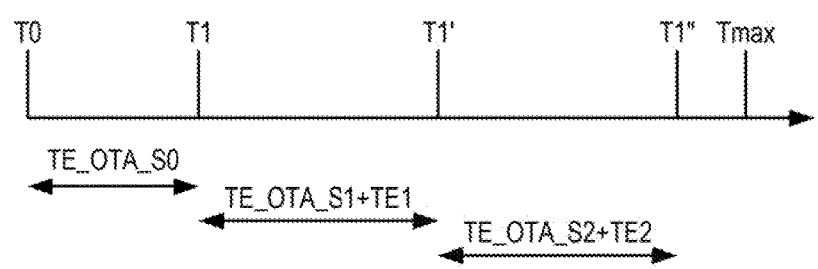
FIG. 5 illustrates an accumulated time error with the common time reference T0 for a multiple hop chain of IAB nodes.
Figure 2:
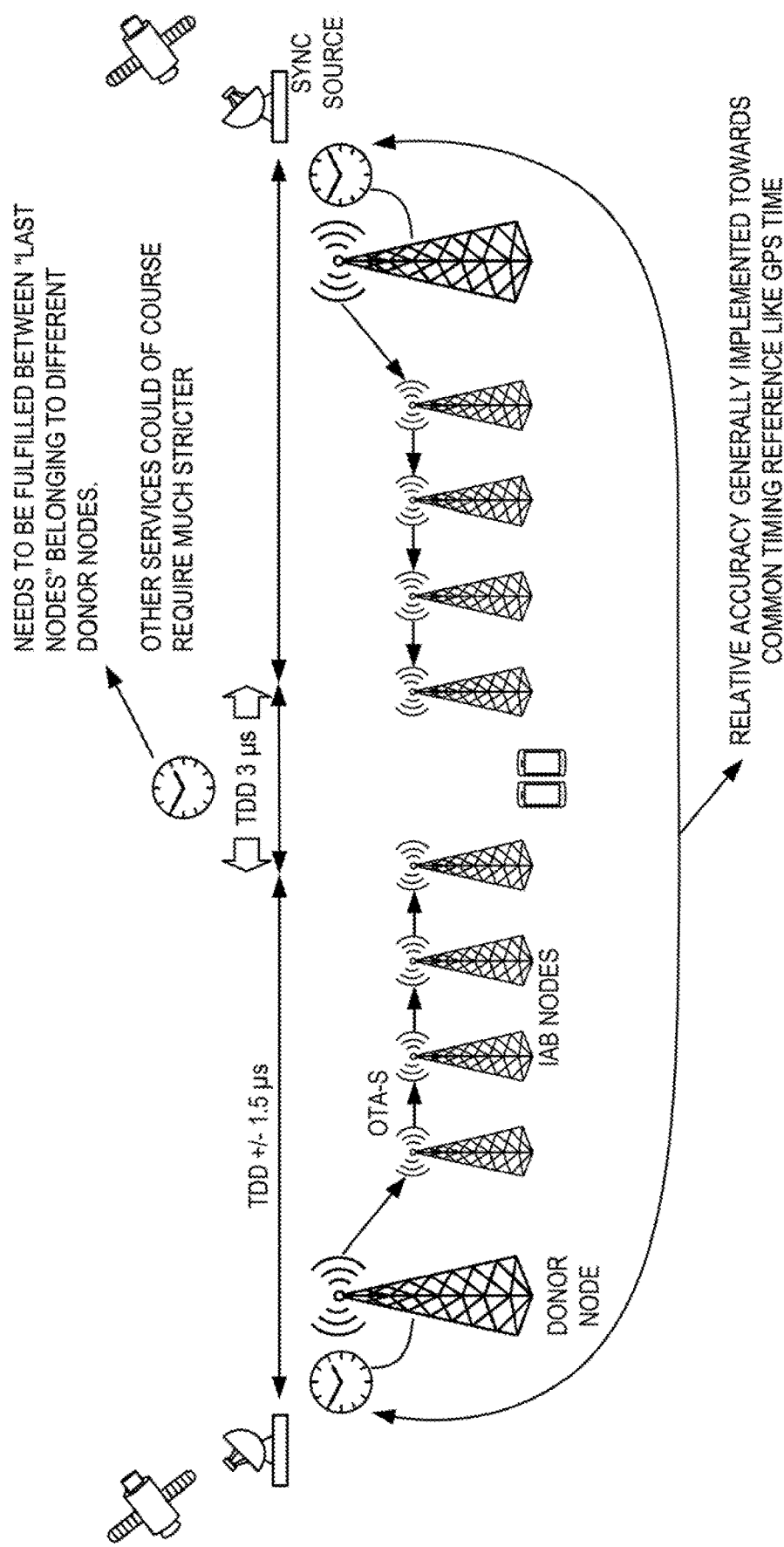
FIG. 2 illustrates a schematic diagram of an IAB synchronization mechanism.

The IAB-DU for the access link needs to be time aligned in downlink transmission with a network synchronization accuracy of at least +/−1.5 μs for TDD cell phase sync. FIG. 5 illustrates accumulated time error with the common time reference T0 for multiple hop IAB node. In FIG. 5, it shows the accumulated time error relation at different IAB nodes in a chain The last one should not exceed the Tmax which is, e.g., 1.5 μs according to the current specification.

Sharing of Synchronization Status Among IAB Nodes

Figure 6:
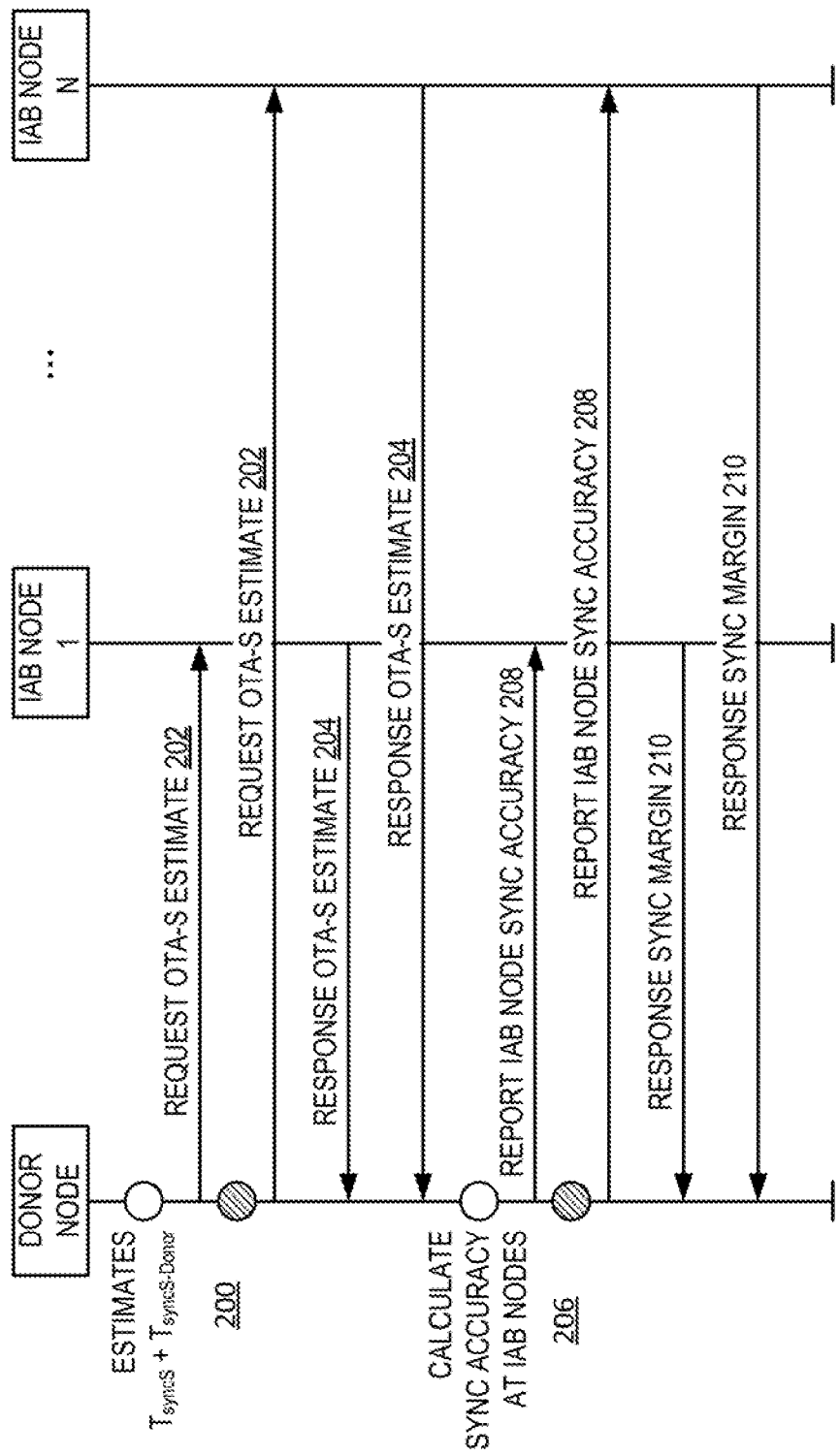
FIG. 6 illustrates an operation of IAB initialization phase signaling.
Figure 7:
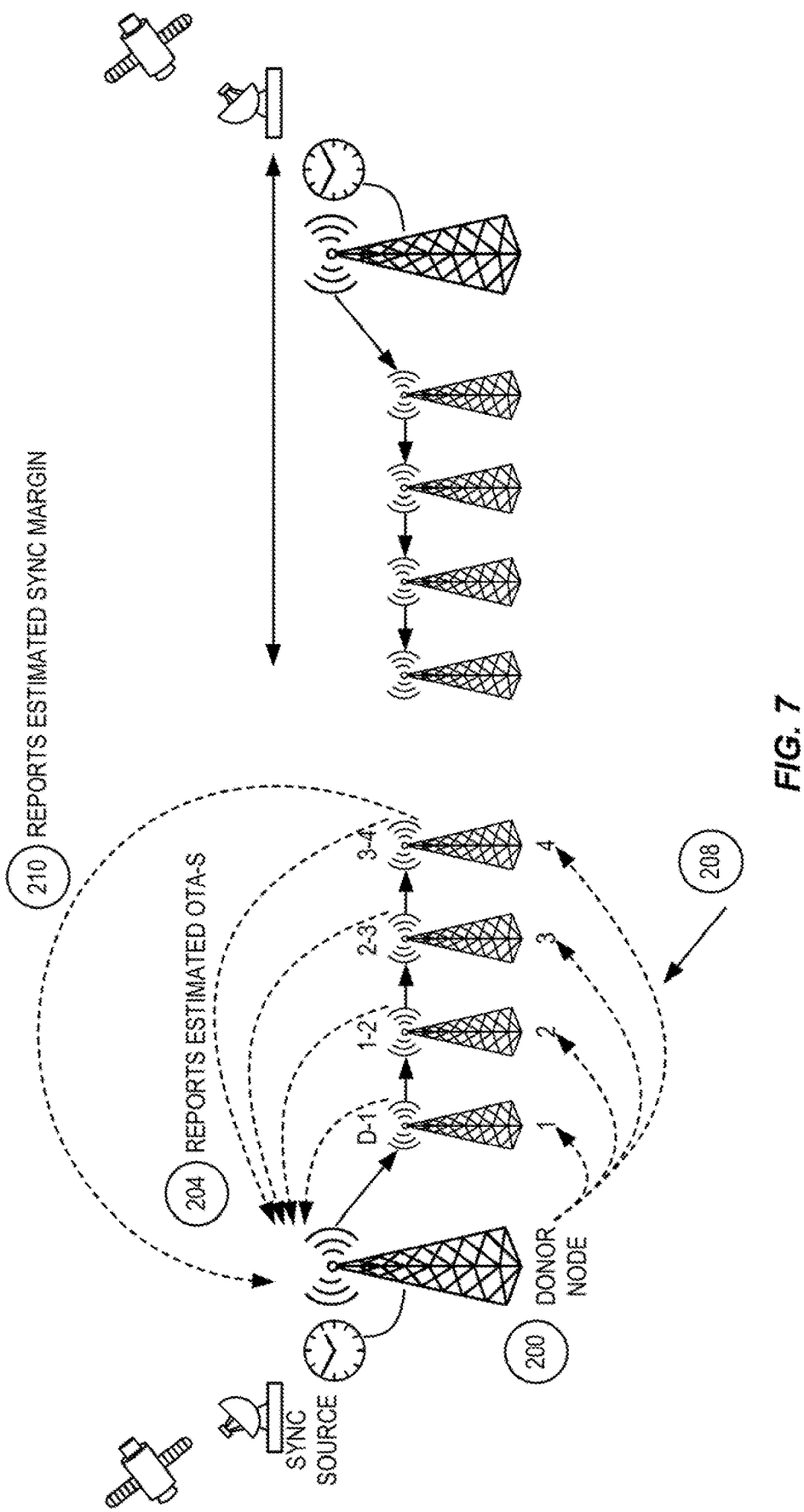
FIG. 7 shows an IAB flow for centralized reporting, according to an embodiment.

In a first example, an IAB node (e.g. IAB1) determines the available time synchronization margin at that IAB node (e.g., IAB1) based on the synchronization accuracy at that IAB node (e.g. IAB1). The synchronization accuracy is estimated by another node (e.g. donor IAB node, parent IAB node, etc.) and provided to the IAB node (e.g. IAB1). The other IAB node estimates the synchronization accuracy at the IAB node (e.g., IAB1) based on the estimated OTA-S timing errors (e.g. $T_{OTA-S\_1}$) reported by the IAB node (e.g., IAB1). The various steps performed in the IAB nodes and the other node (e.g. donor/parent IAB nodes) are described below, see FIG. 6 (IAB initialization phase signaling) and FIG. 7 (IAB reporting flow). FIGS. 6 and 7 illustrate a first example of sharing synchronization status in a chain of IAB nodes, in a centralized way.

Step 200: the Donor node knows (e.g., estimates) $T_{syncS}$+$T_{syncS-Donor}$;

Step 204: Each IAB node reports information about the estimated OTA-S timing errors (e.g. $T_{OTA-S\_1}$ for IAB1, $T_{OTA-S\_2}$ for IAB2, ..., $T_{OTA-S\_N}$ for IAB_N, etc.) to another IAB node, e.g. donor IAB node or parent IAB node.

The OTA-S timing errors may comprise RF propagation delay error and parent node RX tracking to TX error. The IAB node may base its OTA-S timing errors on:
1) Implementation knowledge e.g. through pre-characterization; 2) Radio conditions, reference signal configuration, and availability and methods used to derive OTA-S; 3) Through statistics and stability of measured data, e.g. repeated RF propagation errors through repeated round-trip time (RTT) measurements will provide statistics for stability of measurements, for stable RF channel and stationary units.

The IAB node may transmit the information about the estimated OTA-S timing errors based on one or more of the following configuration mechanisms:
  a. Upon receiving a request or message from another node to send the information about its estimated OTA-S timing errors, e.g. receiving a request from the donor IAB node, parent IAB node etc., as illustrated in step 202 of FIG. 6.
  b. Based on pre-defined rule.

In both cases, the IAB node (e.g. IAB1) may send the report according to one or more of the following reporting mechanisms:
1. Periodic reporting, e.g. once every period (Tp), which can be configured by another node or pre-defined.
2. K number of times (e.g. K≥1); parameter K can be configured by another node or pre-defined.
3. event triggered, or event triggered on a periodic basis. The event may be triggered when certain conditions are met. Examples of such conditions are:
When OTA-S timing errors exceed a certain threshold (Te), which can be pre-defined or configured by another node.
When conditions for deriving OTA-S timing have changed, i.e. RF condition or reference signal configurations.
When the IAB node (donor) enters the holdover state.
If the IAB node (donor) has been in holdover state for at least certain duration (T1) of time.
If the errors due to the IAB node in holdover state exceed a certain threshold (Tx).

Step 206: Based on individual IAB estimated OTA-S timing errors (e.g. $T_{OTA-S\_1}$ for IAB1, $T_{OTA-S\_2}$ for IAB2, ..., $T_{OTA-S\_N}$ for IAB_N, etc.) reported to the other node, the other node (e.g. donor/parent node) determines the estimated sync accuracy towards the IAB nodes (e.g. IAB1, IAB2, ..., IAB_N). The estimated sync accuracy indicates the accuracy which should be met at the IAB nodes.

Step 208: The other node (e.g. donor/parent node) then transmits information related to the estimated sync accuracy towards the corresponding IAB nodes. The other node (e.g. donor/parent node) estimates the sync accuracy e.g. based on the following expression:

$$T_{OTA\text{-}S\_0} = T_{syncS} + T_{syncS\text{-}gNB}$$

$$T_{OTA\text{-}S\_1} = TE\_OTA\_S1 + TE1$$

$$T_{OTA\text{-}S\_2} = TE\_OTA\_S2 + TE2$$

$$T_{OTA\text{-}S\_N} = TE\_OTA\_SN + TEN$$

The donor node can estimate sync source accuracy ($T_{syncS}$), e.g., based on properties of the sync source, such as if it is a local GNSS or from a stratum indication (if derived from PTP). The error from the sync source to the donor node antenna ($T_{syncS\text{-}gNB}$) can be estimated based on installation characteristics, e.g. number of nodes in PTP path and donor node product/configuration characteristics or stability of received timing signals. The reported accuracy fulfills a required accuracy at the last IAB node (normally a holdover margin $T_{hold\_N}$ would be needed at normal operation). As an example: Tmax=1.5 µs.

$$T_{OTA\text{-}S\_0} + T_{OTA\text{-}S\_1} + T_{OTA\text{-}S\_2} + \ldots + T_{OTA\text{-}S\_N} \leq \pm T\max$$

For example, the donor node can estimate the sync accuracy towards IAB nodes IAB1, IAB2, . . . , IAB_N as follows:

For IAB1, the estimated sync accuracy is $T_{OTA\text{-}S\_0} + T_{OTA\text{-}S\_1}$;

For IAB2, the estimated sync accuracy is $T_{OTA\text{-}S\_0} + T_{OTA\text{-}S\_1} + T_{OTA\text{-}S\_2}$; and For IAB_N, the estimated sync accuracy is $T_{OTA\text{-}S\_0} + T_{OTA\text{-}S\_1} + T_{OTA\text{-}S\_2} + \ldots + T_{OTA\text{-}S\_N}$.

Step 210: Based on the received estimated sync accuracy in step 208, each IAB node (e.g. IAB1, IAB2, . . . , IAB_N) estimates the available synchronization margin at that IAB node. The sync margin can be a difference between the estimated sync accuracy received from the other node and the accuracy needed to support a service. For many 3GPP services, the synchronization accuracy is defined as relative to other nodes frame timing. If the IAB node is capable of deriving its relative timing by listening to neighbor node transmission, that could also be used to derive the estimated margin. Each IAB node uses the estimated margin for one or more tasks or operations. For example, it can report information about the sync margin to other nodes. In another example, if the margin is smaller than the threshold, then the IAB node may not support a particular service or operation. The margin may further be related to the sync requirement of dependent services supported by the IAB node. Examples of services are carrier aggregation, positioning, CoMP, dual connectivity, etc. The reporting could be pre-configured to occur as a response to a received estimated sync accuracy, based on a pre-defined periodicity, or based on a triggering event, like a change in services that impacts its required sync accuracy and thereby the margin.

In another example, there is provided a method of sharing synchronization status among IAB nodes in a distributed manner.

Figure 8:
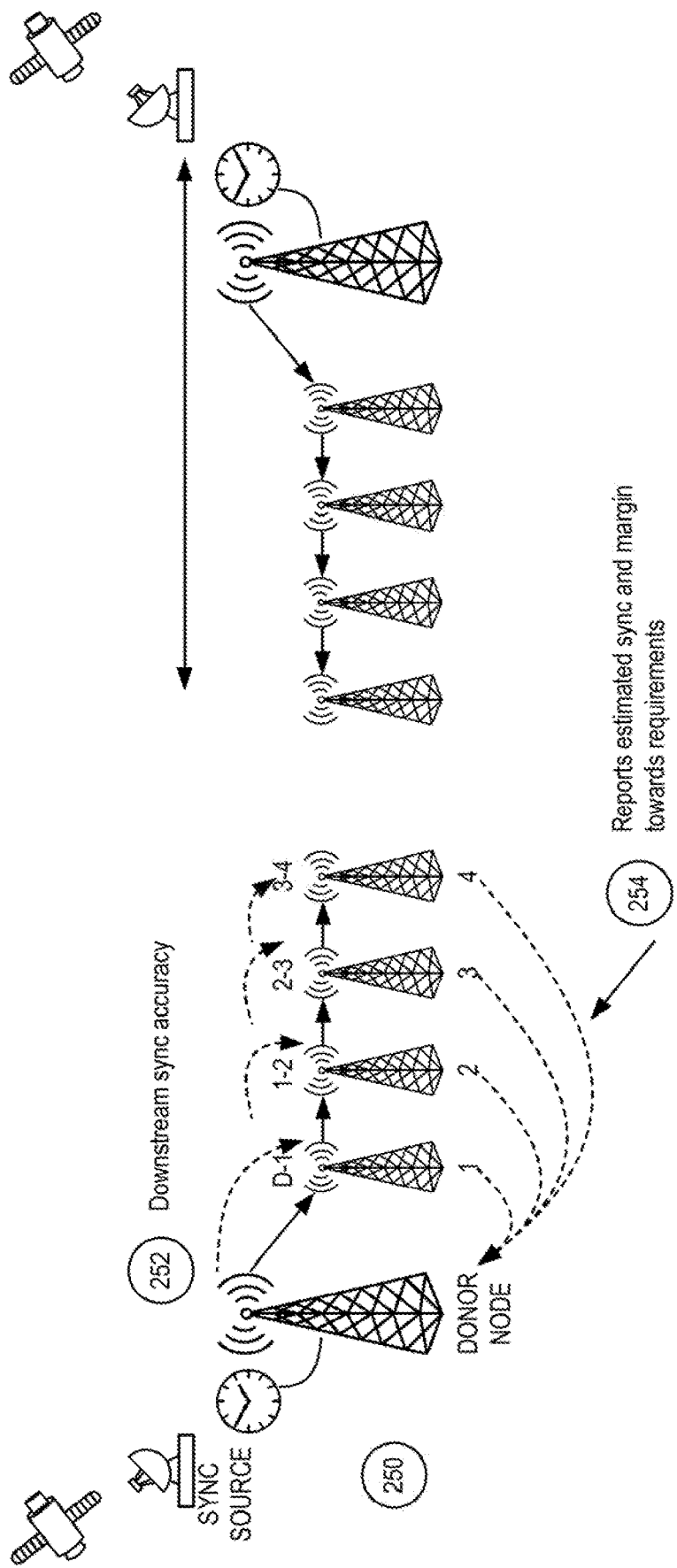
FIG. 8 shows an IAB flow for distributed reporting, according to an embodiment.

In this example, an IAB node (e.g. IAB1) determines the available time synchronization margin at that IAB node (e.g., IAB1) based on the synchronization accuracy at that IAB node (e.g. IAB1). For OTA-S, the synchronization accuracy of IAB1 against the synchronization requirement between cells also depends on the upstream parent node accuracy at its antenna and OTA-S accuracy between this parent and IAB1. In FIG. 8, which illustrates an IAB reporting flow for distributed reporting, the parent node is illustrated as a donor node, but it could by any parent node.

It is assumed that IAB1 can estimate the OTA-S accuracy towards its parent node.

To estimate the synchronization at IAB1, in addition to its OTA-S estimate, the IAB node needs to know its parent node's synchronization accuracy.

The synchronization accuracy is related to either a frequency error or time error. Herein, the time error is used as an example, but the frequency error or both can be also applicable.

In FIG. 8, step 250 can be performed by the the Donor node or by any parent IAB nodes, if such nodes are configured with a GNSS synchronization source and locked to the GNSS.

Step 250: the Donor node estimates a total of timing/frequency errors including synchronization errors related to synchronization source ($T_{syncS}$) and additional internal errors ($T_{syncS\text{-}Donor}$) at its antenna reference points and reports the total of timing/frequency to the first downstream node IAB1. This is valid for any IAB node using a local sync source, such as GNSS and acting as a parent node to any downstream IAB node.

Step 252: IAB1, using OTA-S towards the donor node, receives a donor node's synchronization estimate. IAB1 estimates a total synchronization accuracy by adding additional synchronization inaccuracies (frequency and time) towards the donor node to the received donor node's synchronization estimate. The additional synchronization accuracy towards the donor node can be based on its estimated OTA-S uncertainties. The estimated total synchronization accuracy allows to determine a synchronization margin. IAB1 reports its total estimated synchronization accuracy to further downstream, i.e. to IAB2, and then IAB2 performs step 252 and so on.

Step 254: Each IAB node could inform the Donor node (and potentially its parent node) about the Synchronization error (frequency or time) and margin against/based on the synchronization requirement of dependent services supported, thus allowing for centralized supervision.

If the Donor node or some IAB node in the chain enters holdover, it reports this (i.e. holdover) towards downstream IAB nodes, if using OTA-S, all further downstream nodes could be considered in holdover. It could trigger more frequent reporting and potential need for mitigation methods, which will be described herein below.

Figure 9:
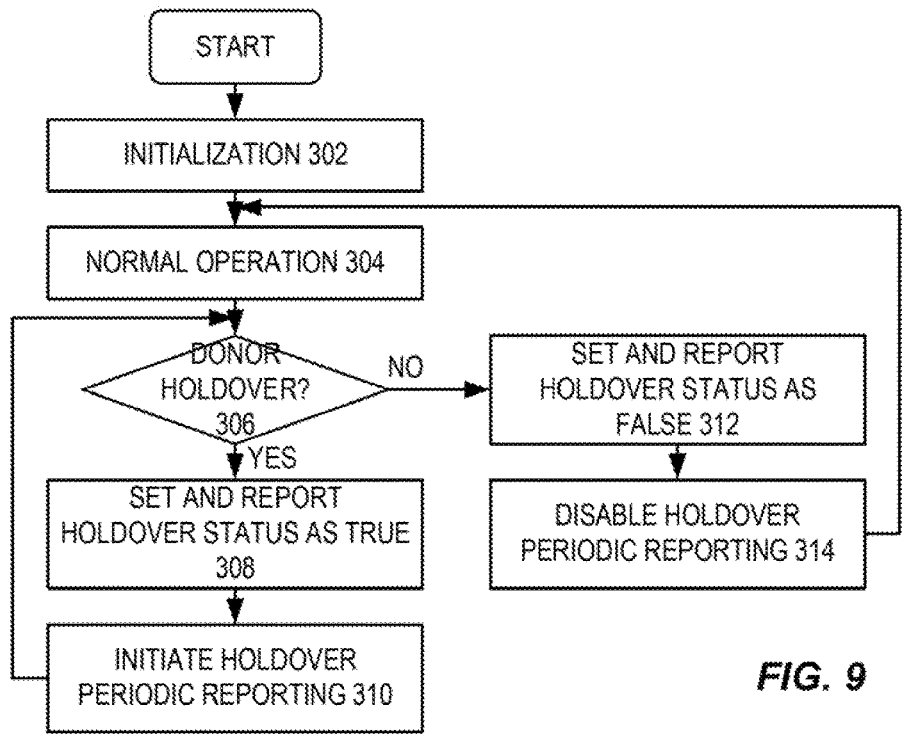
FIG. 9 illustrates a holdover operation, according to an embodiment.

During normal operation, the synchronization can generally be assumed to be stable over time and if there is no change in the required accuracy, reporting overhead could be minimized. However, if the donor node or any IAB node using a local synchronization source and acting as a parent node to any downstream node enters holdover and thereby loses its ability to maintain an accurate and stable timing, it reports its holdover status (e.g. as true) to other IAB nodes. This is to notify/indicate to the other nodes the reason for a likely timing drift, followed by a potentially more frequent periodic reporting of total estimated synchronization accuracy (see step 252 of FIG. 8) and Synchronization error and margin (see step 254 of FIG. 8) and reporting of steps 204, 206 and 210 of FIG. 7. FIG. 9 illustrates a holdover operation.

The frequency of the reporting of holdover could be pre-configured or based on:

Donor node or IAB node with local sync change in step 250 of FIG. 8 or step 200 of FIGS. 6 and 7, i.e. change of $T_{syncS}+T_{syncS-Donor}$ due to timing drift;

Estimated synchronization margins at each IAB node.

These parameters allow to determine the remaining estimated operational time.

For example, the method of FIG. 9 starts with an initialization step 302 of the donor node (and the chain of IAB nodes). In step 304, the donor node functions in a normal operation. If in step 306, it is determined that the donor node is in holdover state, the donor node sets its holdover status to true (step 308). In step 310, it sends a report of the holdover status to its downstream IAB node. Step 308 and 310 also apply to all parents IAB node towards their children IAB nodes.

When it is determined that the donor node is not in holdover state, the donor node sets its holdover status to false (step 312). In step 314, it disables periodic reporting.

Figure 10:
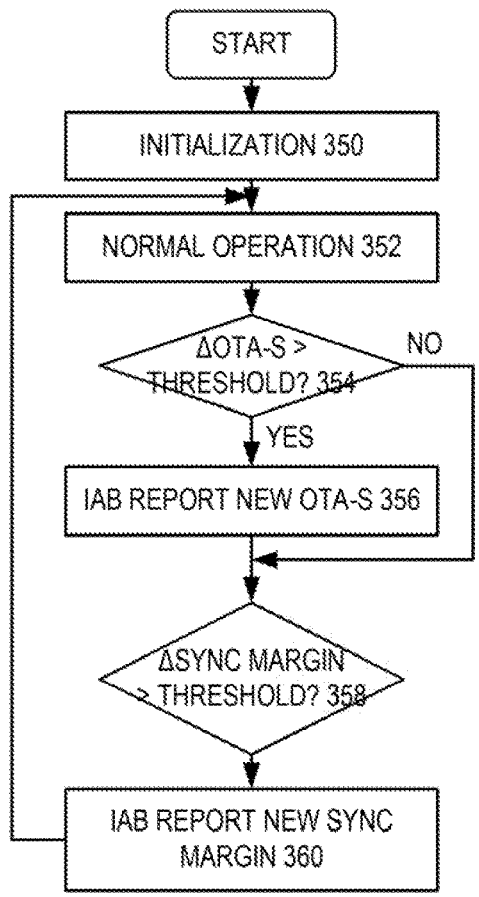
FIG. 10 shows an operation of an IAB node's OTA-S and sync margin delta changes.

Also, the following events can trigger reporting or a change of frequency of reports:

Delta change in synchronization margin>pre-configured threshold;

Delta change in link OTA-S performance>pre-configured threshold;

This is shown in FIG. 10, which illustrates an IAB node's OTA-S and sync margin delta changes. The Donor node or parent IAB node in a multiple IAB hop chain could still request IAB node sync margins (see step 254 of FIG. 8 and step 210 of FIG. 7) or IAB node's OTA-S estimates (step 204 of FIG. 7) at any time. A child node can request synchronization error estimates from its parent node at any time.

FIG. 10 starts with initializing the chain of IAB nodes including the donor node (step 350). In step 352, the chain of IABs functions in a normal operation. In step 354, if it is determined that a change in the OTA-S is superior to a threshold for an IAB node, the IAB node reports a new OTA-S (step 356). In step 358, if it is determined that a change in the sync margin is superior to a threshold, the IAB node reports a new sync margin (step 360).

Figure 11:
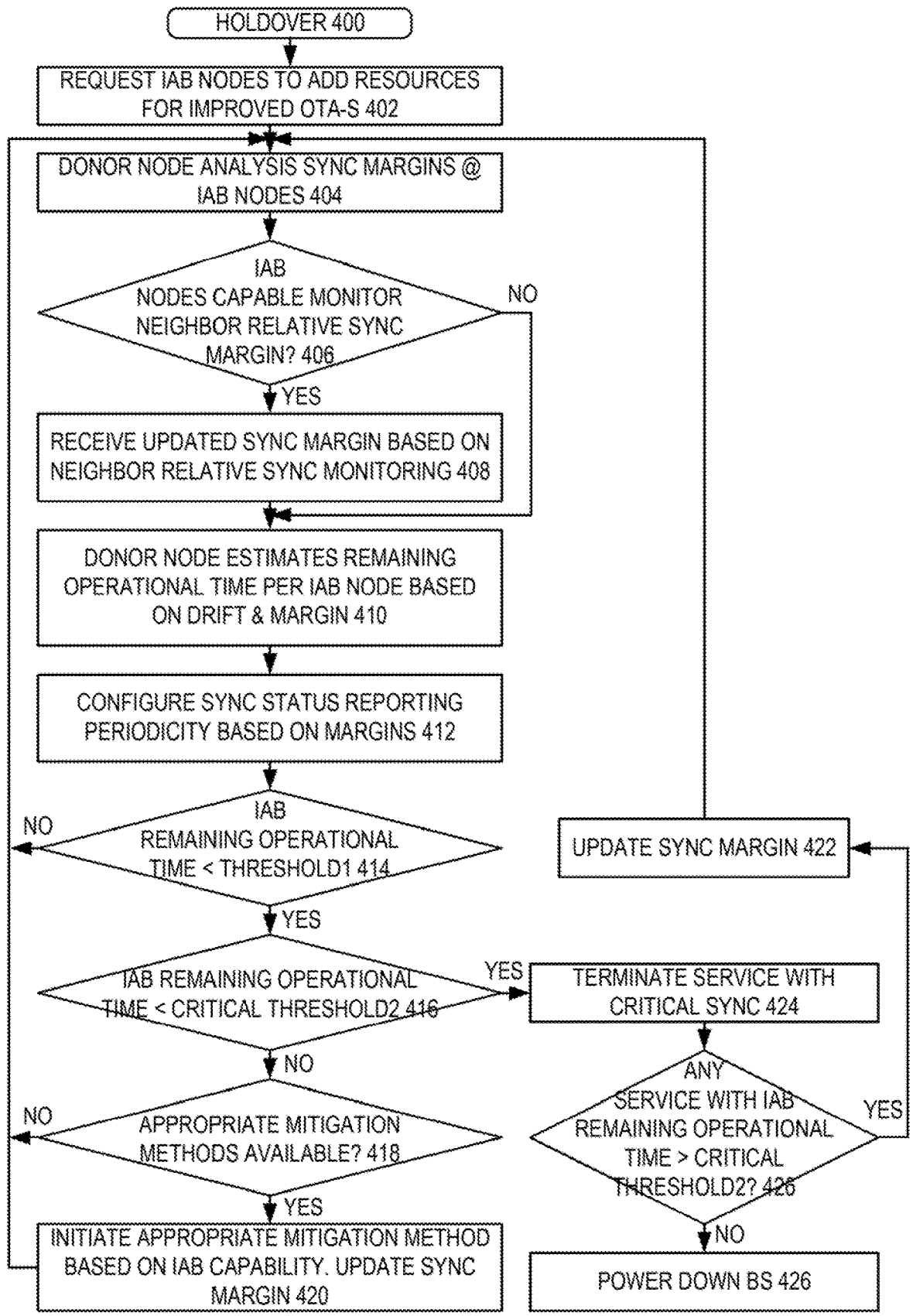
FIG. 11 illustrates a holdover operation flow chart, according to an embodiment.

Inter IAB Coordinated Mitigation Methods for Prolonged Holdover (Increased Availability) and Graceful Degradation FIG. 11 is a flow chart for holdover operation of an IAB node according to an embodiment. The flow chart shows proposed methods to coordinate and configure the IAB nodes for safe and preferably for prolonged holdover operation, through mitigation methods for graceful degradation.

Threshold1 in the flow chart of FIG. 11 is used as a threshold to evaluate if the remaining operational time is low and mitigation efforts are needed. The remaining operational time is a function of:

Estimated donor timing drift dependent on frequency stability (oscillator drift);

IAB remaining sync margin dependent on supported services with timing dependencies.

The threshold is set large enough to allow setting up appropriate mitigation methods.

The critical threshold2 is a level that, when reached, requires creating larger sync margins by, e.g. prohibiting certain synchronization critical services, only allowing ones with larger sync margin. If an existing margin is towards mandatory TDD cell phase, power down of the BS might be needed to prevent causing interference towards other systems.

Note that while a number of techniques are described below (and all are shown as being part of the process of FIG. 11), the process of FIG. 11 is not limited to using all of these techniques. The process of FIG. 11 may include any one or more of these techniques.

The method starts with an IAB node (donor node) in the holdover state (step 400). In this case, the donor node can request the IAB nodes to add resources for improved OTA-S (step 402). As a note, when assigning more synchronization resources to an IAB node, it may minimize OTA-S in each link but at the expense of overhead.

Indeed, using more resources in the RF time frequency grid would, at expense of additional overhead, generally improve OTA-S performance. This could be a first action during holdover in the IAB nodes, since the most critical downstream IAB node is the one that is most impacted by accumulated OTA-S errors.

Coordination between nodes to prevent interference during timing signal reception, e.g. by introducing muting patterns can also be means to improve OTA-S performance.

In step 404, the donor node can analyze the sync margins at the IAB nodes.

Figure 12:
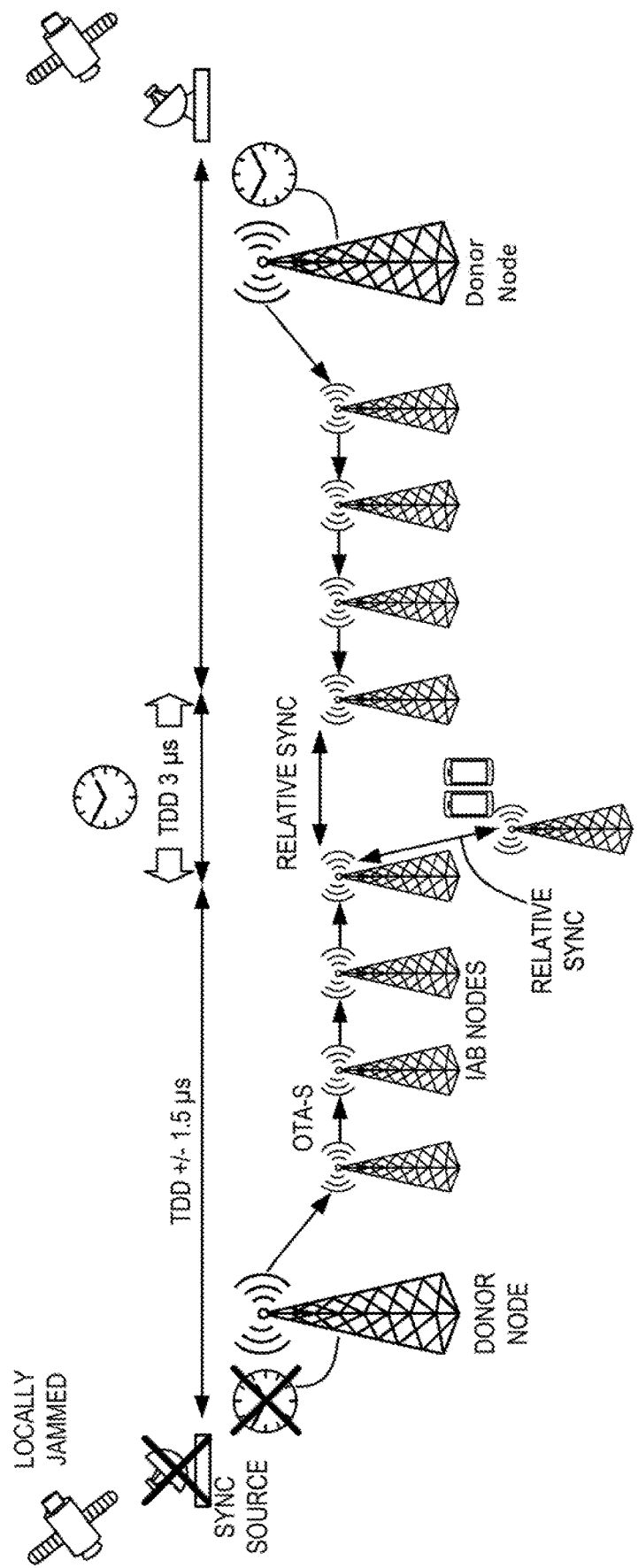
FIG. 12 illustrates an operation of monitoring neighbor relative sync.

In step 406, the donor node determines if the IAB nodes are capable of monitoring neighbor relative sync margin/synchronization. Most of the 3GPP specified timing requirements are relative between BS frame timings. This is true for TDD cell phase sync even if for practical reasons TDD sync is often implemented as reference towards common known time reference, like GPS time. Various methods exist for a BS to listen and derive relative timing from neighbor base stations. Methods are described in PCT/SE2018/050714 entitled "A Method for Virtual Synchronization using Radio Interface Observations", see also FIG. 12, which illustrates monitoring of neighbor relative sync. Knowing the relative relation could result in more accurate and larger reported sync margins for IAB nodes.

If an IAB node is capable of monitoring neighbor relative sync margin, it can receive updated sync margin based on neighbor relative sync monitoring (step 408). If the IAB node is not capable, it goes to step 410.

In step 410, the donor node estimates the remaining operational time per IAB node based on drift and sync margin.

In step 412, the donor node configures sync status reporting periodicity based on the sync margins.

In step 414, the donor node determines if the IAB remaining operational time is inferior to a threshold; if so, it determines if the IAB remaining operational time is inferior to a critical threshold (step 416). In response to determining that the IAB remaining operational time is not inferior to the critical threshold, the donor node determines if there is an available and appropriate mitigation method (step 418). If so, then the mitigation method based on an IAB capability can be initiated (step 420). Then, the sync margin is updated. If in step 416, the IAB remaining operational time is inferior to the critical threshold, then in step 424, the service with critical sync is terminated. Then in step 426, the donor node determines if any service with IAB remaining operational time is superior to the critical threshold. If yes, then the sync margin is updated (step 424), if not, then the BS is powered down (step 426).

Example Mitigation Methods

The selection of mitigation method depends of available and supported options.

The IAB node supported options could be shared during initialization of the system.

The purpose is to gracefully prolong operation during holdover.

Handover of Critical IAB Node to Another Candidate Parent Node (not in Holdover)

Figure 13:
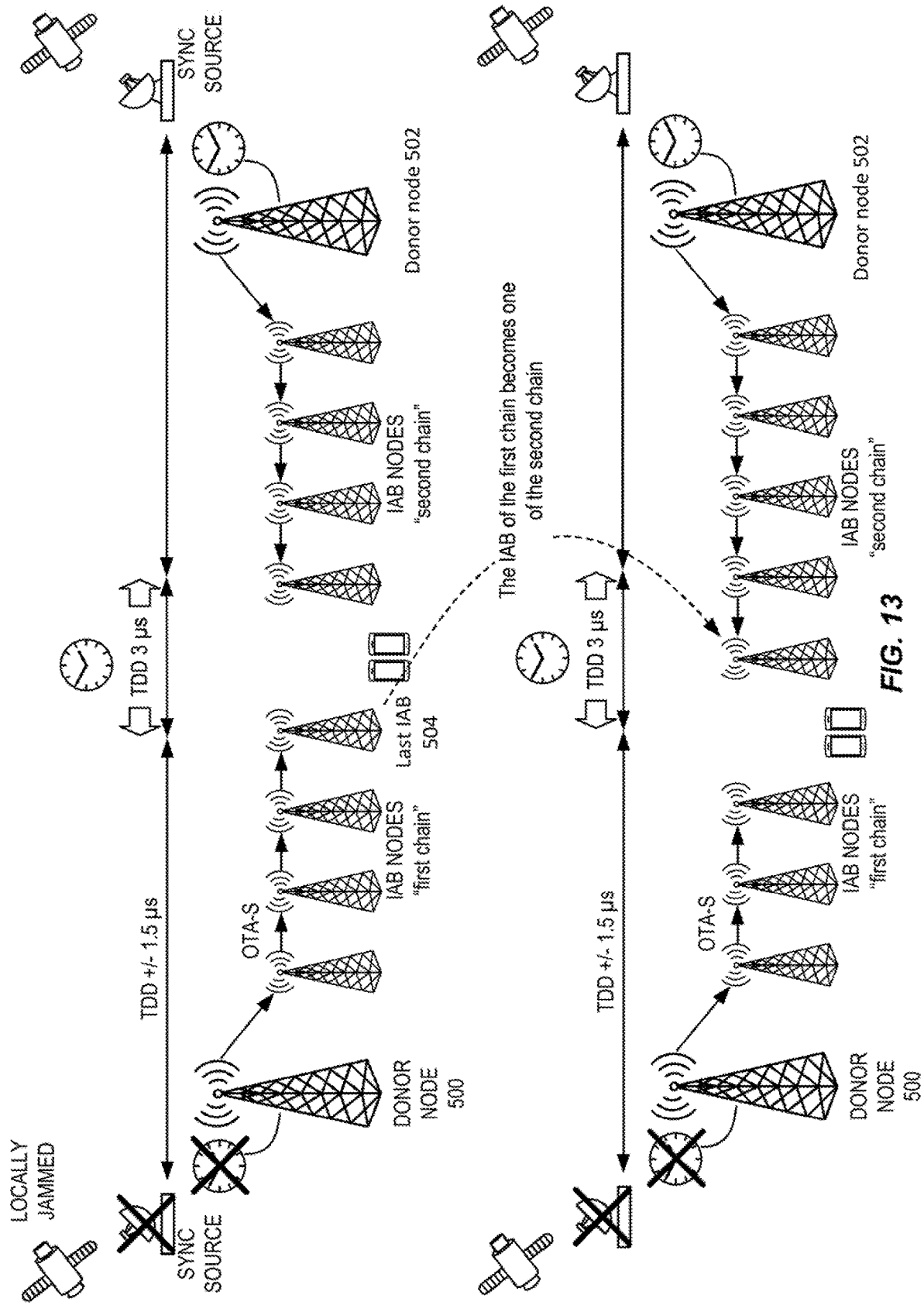
FIG. 13 illustrates a handover of an IAB node to another IAB chain of nodes.

Assume donor node 500 (from the first chain) loses its synchronization and goes to holdover, see FIG. 13, which illustrates a handover of an IAB node to another IAB chain.

One approach would be that donor node 500 continues its operation and somewhat semi gracefully performs "removing "last" IAB nodes in the first chain, when timing is not estimated to be fulfilled for that node. The last node will not be operational.

But if Donor node 502 still has an operation sync source, a better approach would be if "last" IAB node 504 is "handed" over to the second chain, e.g. negotiated and set-up via between donor nodes 500 and 502 based on the assumption that "last" previous IAB from the second chain can act as parent to "last" IAB of the first chain. A direct communication with the potential new parent node of the second chain could also be a possibility.

Examples of inter node information exchange to decide if a last IAB node is a feasible candidate can be:
  Sync status of the new candidate parent node of the second chain;
  IAB node of the first chain OTA-S estimate;
  First chain node target accuracy;
  Spare capacity of new IAB nodes of the second chain for additional backhaul support.

Setting up and configuring a new parent node takes some time and reason for threshold1 (in FIG. 11). For example, a rule can be defined that if an IAB node enters into the holdover state, then that IAB node is required to reselect (e.g. handover) to another IAB node (i.e. to a new parent IAB node). The IAB node can also be pre-configured with one or more candidate IAB nodes (i.e. potential parent IABs, donor IAB, etc.) to which the IAB is required to reselect upon entering in holdover state. This can be realized by one or more rules, which can be pre-defined or configured by another node, e.g. by donor node. Examples of rules are:
  The IAB node is required to reselect another IAB node to be connected to (i.e. to a new parent IAB node) provided that it has been in the holdover state for a certain time period.
  The IAB node is required to reselect another IAB node to be connected to (i.e. to a new parent IAB node) provided that the estimated synchronization accuracy at the IAB node as indicated by the other node (e.g. donor node) is worse than a certain threshold.
  The IAB node is required to reselect another IAB node to be connected (i.e. to a new parent IAB node) provided that the available synchronization margin at the IAB is worse than a certain threshold.
  The IAB node is required to reselect another IAB node to be connected to (i.e. to a new parent IAB node) provided that it cannot support or offer certain type of services (e.g. positioning, carrier aggregation, etc.) due to insufficient synchronization margin available at the IAB node.

Once donor node 500 leaves the holdover operation, the IAB node could be re-assigned to a previous parent node of the first chain.

New parent candidate nodes for an IAB node could, e.g. be derived from:
  1. A list of candidate parent nodes from the donor node (pre-configured and dynamically updated when needed, e.g. new deployed nodes);
  2. By listening to neighbor cell RF transmissions;
  3. A combination of #1 and #2.

Figure 14:
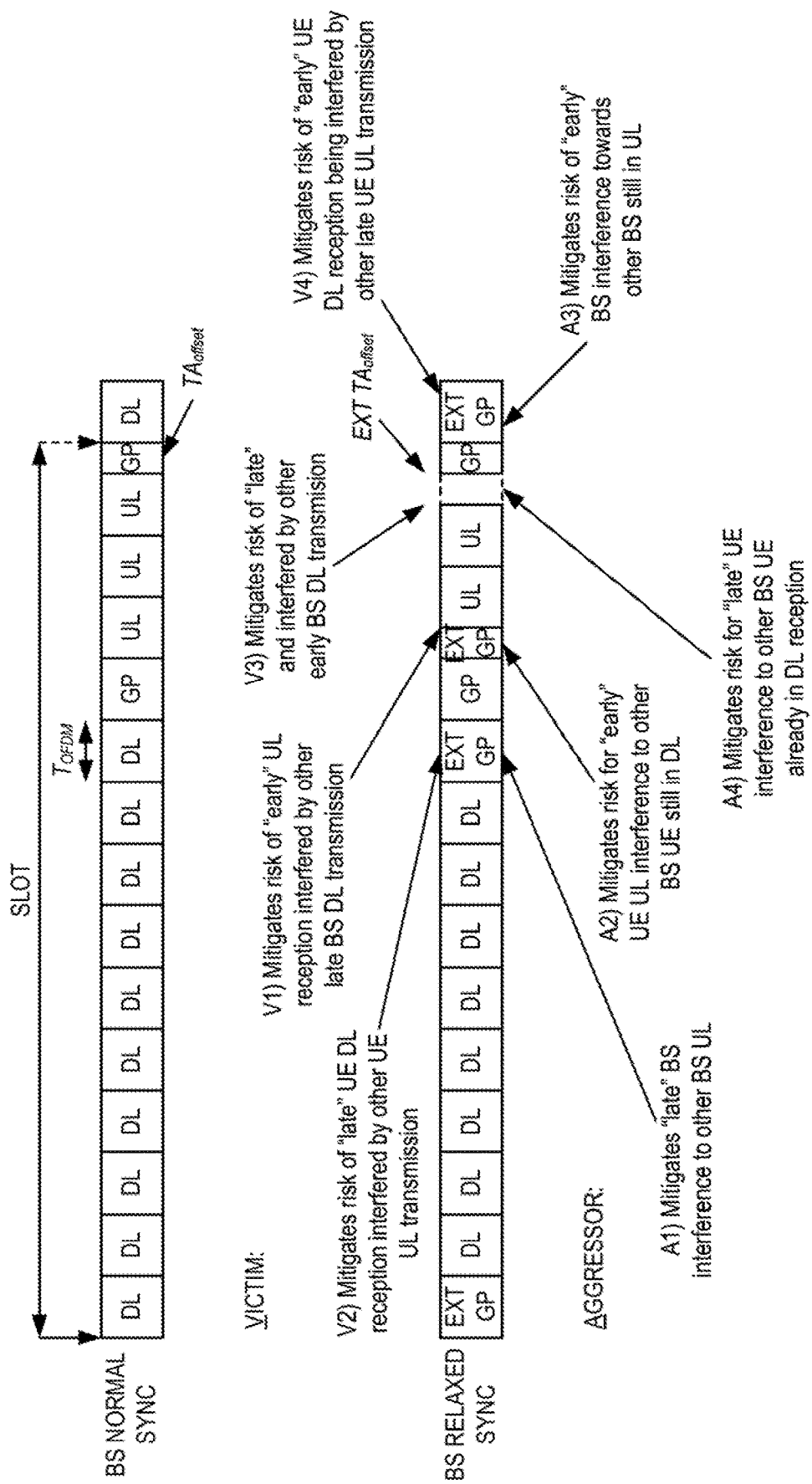
FIG. 14 illustrates an operation of adding isolation around TDD switching points.

Increase Isolation Around TDD Switching Points Gradually Starting with the Last IAB Node in the Chain Creating scheduling gaps, avoiding late DL transmissions at the "last" node prior to switching point and avoiding early receptions would also allow a more graceful approach than turning off an IAB node. Also, another possibility for a more graceful approach includes offsetting UpLink earlier (i.e. bias the RF distance dependent parameter $N_{TA}$ in existing 3GPP Timing Advance mechanism). This concept is covered by WO2018/132046, see FIG. 14, which illustrates adding isolation around TDD switching points. For TDD cell phase sync, this would lead to additional sync margin at IAB node.

Pre-configured configurations to be used could be assigned during the initialization of IAB nodes and used when the margins are below a defined threshold. Various configurations with different levels of additional isolation can be used, depending on estimated synchronization margins. Other holdover mitigation methods are not excluded.

Even if generally the donor node can be considered as a central entity for information collection and control, another central entity higher up in the network architecture can take this role. There could be benefits with such an approach, e.g. for handover between IAB nodes belonging to different donor nodes.

Local Synchronization Source at an IAB Node and Relative Parent Child Frequency Accuracy (Problem #4)

If an IAB node is using a local sync source for its absolute time and frequency instead of OTA-S, it is not dependent on its parent node's synchronization accuracy for its own operation. However, the relative frequency error between the IAB-MT towards its upstream node depends on both the absolute frequency error of the IAB-MT and the absolute frequency error of the upstream parent node. During normal operation, the absolute frequency error is small when the nodes are synchronized and generally far more accurate than the allowed specified 3GPP BS class accuracies. However, if either node is in holdover and has lost its synchronization source, the absolute frequency will depend on the performance of the internal oscillator and there would be a risk that the relative frequency error will be exceeded.

It can be assumed that the IAB node in holdover can estimate its absolute frequency during holdover (based on characteristics of its internal oscillator, temperature, etc.) and decide if it exceeds the allowed absolute IAB-DU limit. In this scenario, there would be a need to exchange information between the nodes for holdover status. This is illustrated in FIG. 15, showing an IAB node with local synchronization in communication with a donor node or parent IAB node.

Figure 15:
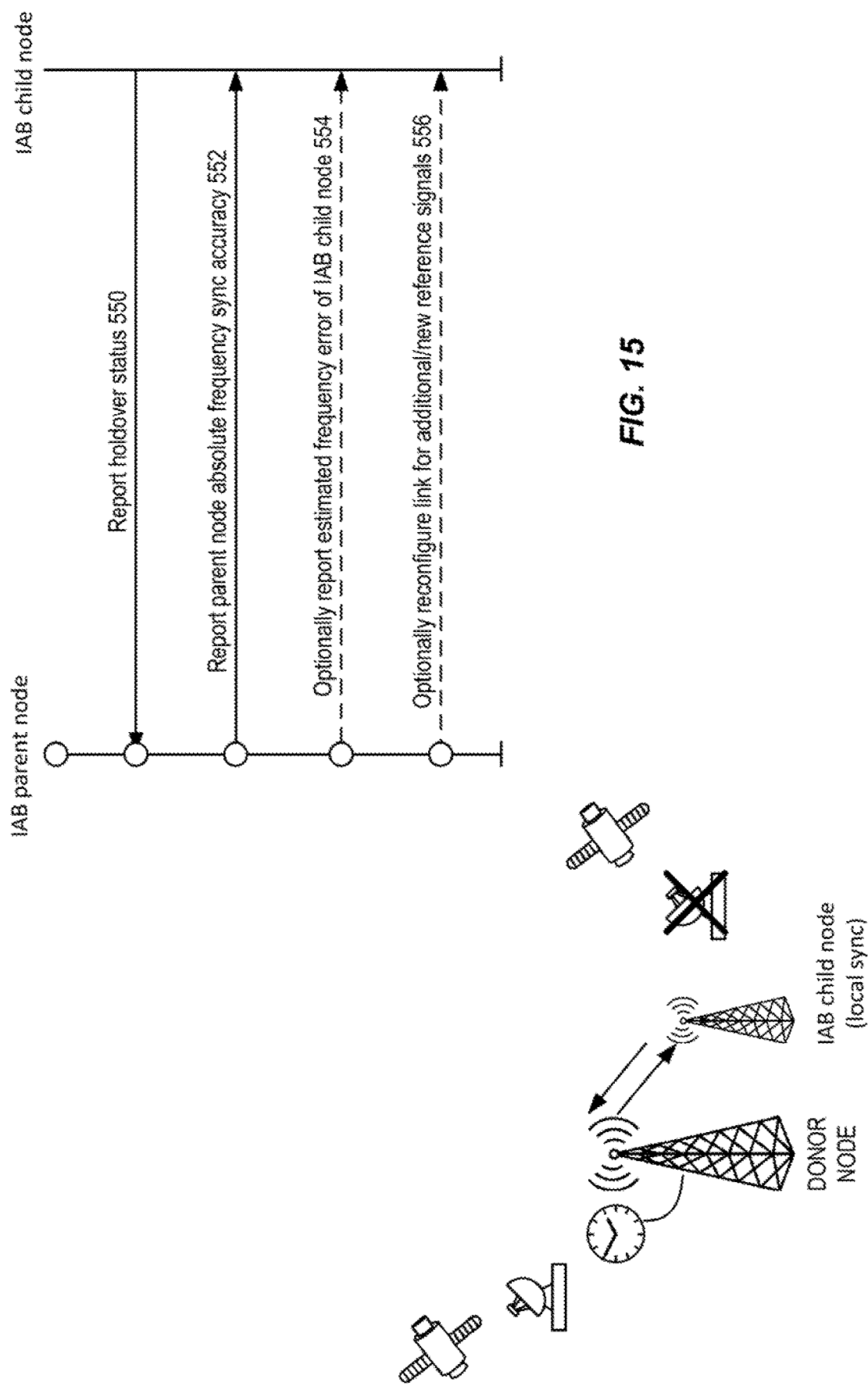
FIG. 15 illustrates an operation of an IAB node with local synchronization.

In FIG. 15, the parent node is shown as a donor node but could be any parent node in a chain of IAB nodes towards an IAB node with local sync source.

In step 550, the child node using a local sync source reports its holdover status towards its parent node. This step could potentially also include its estimated frequency error/drift.

In step 552, in response, the donor node could report its absolute frequency error (estimated frequency error). By so doing, the child node can determine/decide if it can fulfill the relative frequency accuracy towards the parent node, using its own absolute frequency, estimated frequency error/drift and the estimated frequency error of the donor node, for example.

Optionally, in step 554, the parent node could estimate a relative frequency error based on its local accurate frequency reference and an IAB child upstream transmission. The parent node can provide the IAB child node with an estimated frequency deviation (or based on the child node's reported absolute frequency error).

Optionally, in step 556, the parent node can reconfigure links for additional or new reference signals.

Some mitigation mechanisms (as described above) could be triggered either based on an estimated or measured frequency deviation or based on a link demodulation performance degradation.

The IAB slave/node could, if supported, switch from the local sync source to OTA-S, if supported, or use assisted information from the parent node (estimates of child frequency error) as long as the parent node has good synchronization to tune its frequency.

The link between IAB parent and child nodes could be configured with additional/new reference signals to mitigate throughput degradation due to larger frequency errors.

Similar but in an opposite way, the parent node could inform the slave/child node if the parent node is in holdover and exchange information as in FIG. 15, to evaluate and secure relative accuracy between the parent and child nodes. If both parent and child nodes are in holdover, mutual exchange of frequency error estimates can be used to estimate the relative frequency error.

Figure 16:
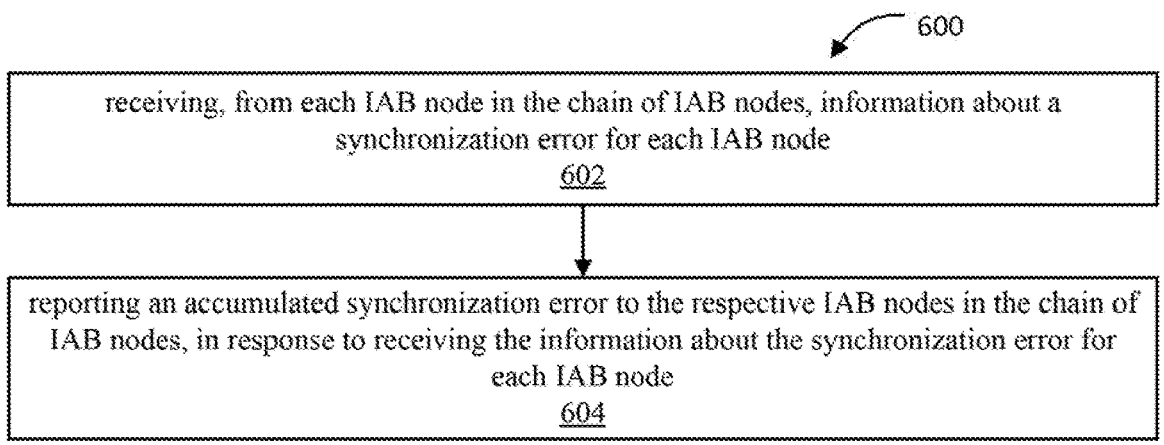
FIGS. 16 to 18 illustrate different flow charts of methods in an IAB node, according to some embodiments.

FIG. 16 illustrates a flow chart of a method 600 in an IAB node, such as a donor IAB node, for determining and sharing synchronization accuracy for a number of IAB nodes in a chain of IAB nodes communicatively coupled to each other. The method 600 comprises:

Step 602: receiving, from each IAB node in the chain of IAB nodes, information about a synchronization error for each IAB node.

Step 604: reporting an accumulated synchronization error to the respective IAB nodes in the chain of IAB nodes, in response to receiving the information about the synchronization error for each IAB node.

In some examples, the (donor) IAB node may further, based on the received information of synchronization error for the IAB nodes, determine the accumulated synchronization error for each IAB node in the chain of IAB nodes.

In an example, the synchronization error may be an OTA-S timing error of the node.

In some examples, determining the accumulated synchronization error for each IAB node may be based on a position of an IAB in the chain of IAB node and/or based on: $T_{OTA-S0} + \Sigma_{i=1}^{X} T_{OTA-S\_i}$, where $T_{OTA-S0}$ is a sum of a synchronization source input error at a donor IAB node and an internal error at the donor IAB node, and $T_{OTA-S\_i}$ is the OTA-S timing error for the i-th IAB node in the chain of IAB nodes.

In some examples, the IAB node may send a request for the information about the synchronization error to each of the IAB nodes in the chain of IAB nodes.

In some examples, the information about the synchronization error from each IAB node in the chain of the IAB nodes may be received in a report, on a periodic basis or based on events.

In some examples, the frequency of the periodic report can be a function of whether a donor IAB node is in holdover or the (current) IAB node is in holdover.

In some examples, when the donor IAB node is in holdover (or the current node is in holdover), the frequency of the periodic report can be based on a change in a synchronization error of the donor IAB node or IAB node, or, on a change of a synchronization margin at one or more of the IAB nodes in the chain of IAB nodes.

In an example, the IAB node may notify the IAB nodes if a donor IAB node or the IAB node is in holdover. In some examples, the IAB may instruct at least one of the IAB nodes in the chain of IAB nodes to utilize one or more techniques for improving the synchronization error, such as adding synchronization resources; and monitoring neighbor node(s) for relative synchronization.

In some examples, the IAB node may cause one of the IAB nodes in the chain of IAB nodes to handover to a new parent IAB node that is not in holdover.

In some examples, the synchronization error may be one or more of: a timing error and a frequency stability of an oscillator. The synchronization error can be based on a frequency error.

Figure 17:
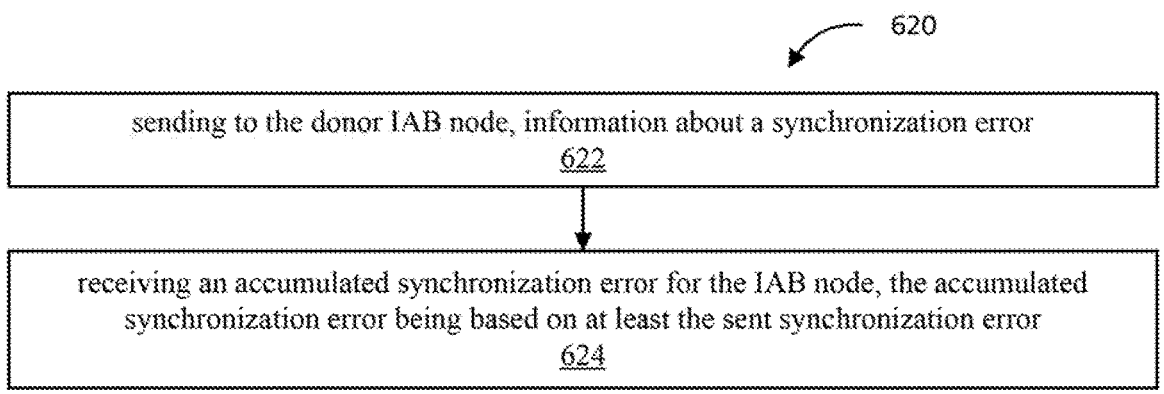

FIG. 17 illustrates a flow chart of a method 620 in an IAB node, in a chain of IAB nodes communicatively coupled to a donor IAB node, the method comprises:

Step 622: sending to the donor IAB node, information about a synchronization error.

Step 624: receiving an accumulated synchronization error for the IAB node, the accumulated synchronization error being based on at least the sent synchronization error.

In some examples, the IAB may further determine the synchronization error. In some examples, the synchronization error may be an estimated OTA-S timing error for the IAB node.

In some examples, the accumulated synchronization error for the IAB node may take into account a position of the IAB node in the chain of IAB nodes.

In some examples, the IAB node may estimate an available synchronization margin at the IAB node based on the accumulated synchronization error.

In some examples, the sending of the information about the synchronization error for the IAB node can be done in a periodic report or in response to an event trigger.

In some examples, the synchronization error may comprise one or more of: a timing error and a frequency stability of an oscillator.

Figure 18:
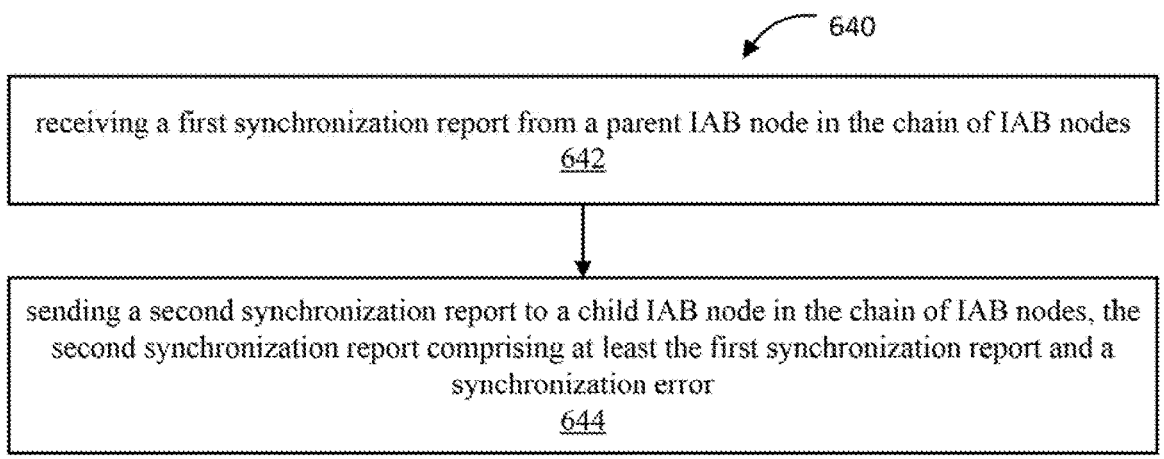

FIG. 18 illustrates a flow chart of a method (IAB) node in a chain of IAB nodes communicatively coupled to each other, the method comprising:

Step 642: receiving a first synchronization report from a parent IAB node in the chain of IAB nodes.

Step 644: sending a second synchronization report to a child IAB node in the chain of IAB nodes, the second synchronization report comprising at least the first synchronization report and a synchronization error.

In an example, the IAB node may determine the synchronization error of the IAB node.

In some examples, the first synchronization report may comprise a synchronization error of the parent IAB node and a third synchronization report from an IAB node that is a parent IAB node to the parent IAB node.

In some examples, wherein the synchronization error may comprise a frequency error, a timing error, or, a frequency error and a timing error.

In an example, the IAB node may determine an accumulated synchronization error by adding the determined synchronization error at the IAB node with the received synchronization error of a parent IAB node.

In an example, the IAB may determine a synchronization margin based at least on the accumulated synchronization error.

In an example, the second synchronization report may comprise an accumulated synchronization margin at the IAB node.

In an example, the second synchronization report may comprise an estimated OTA-S timing error between the IAB node and a parent IAB node.

In an example, sending the second synchronization report can be done periodically or based on a change of a synchronization margin estimated for the IAB node.

Figure 19:
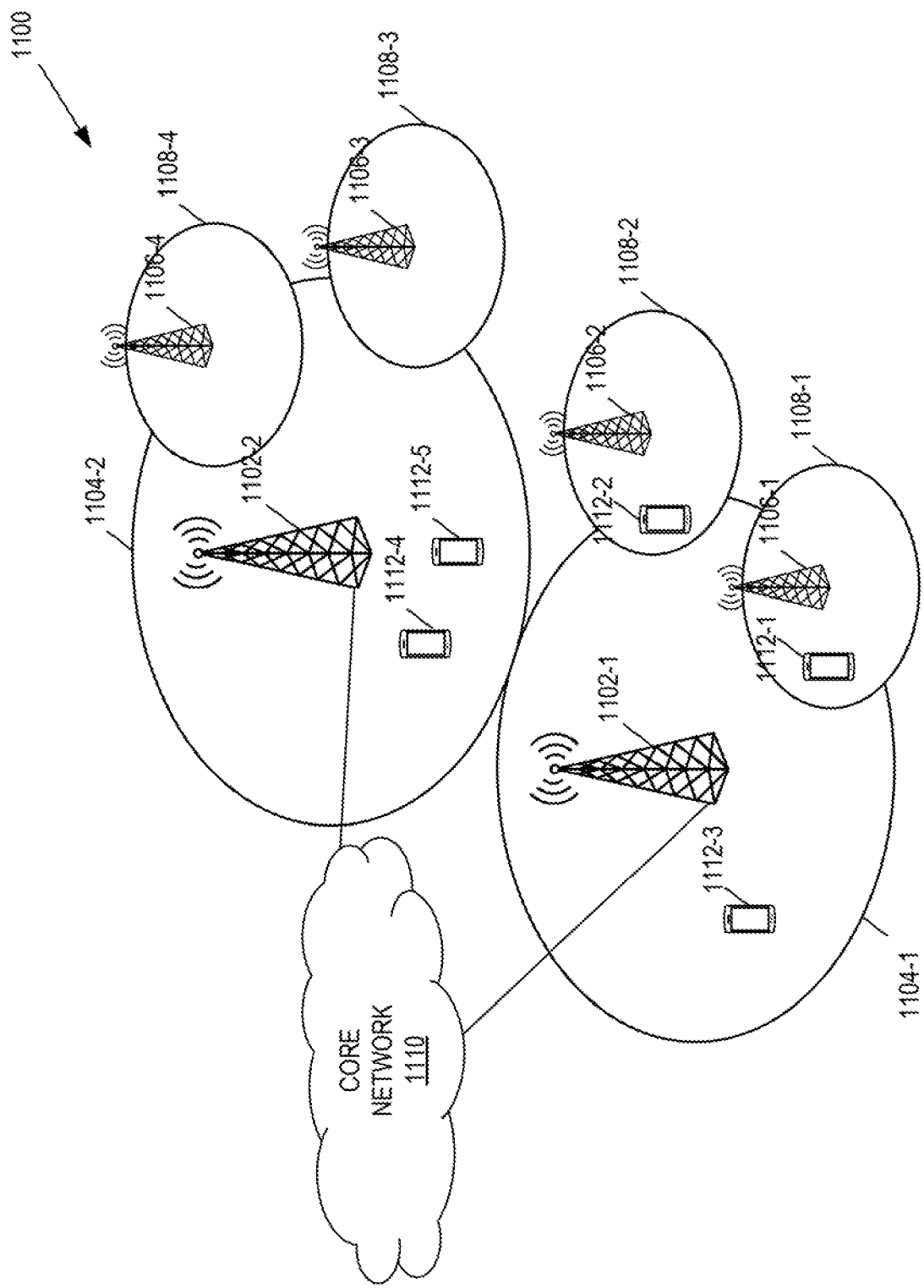
FIG. 19 illustrates one example of a wireless communications system in which embodiments of the present disclosure may be implemented.

FIG. 19 illustrates one example of a cellular communications network 1100 in which at least some aspects of the embodiments above may be implemented. The cellular communications network 1100 may be is an LTE network or a 5G NR network. In this example, the cellular communications network 1100 includes base stations 1102-1 and 1102-2, which in LTE are referred to as eNBs and in 5G NR are referred to as gNBs, controlling corresponding macro cells 1104-1 and 1104-2. The base stations 1102-1 and 1102-2 are generally referred to herein collectively as base stations 1102 and individually as base station 1102. Likewise, the macro cells 1104-1 and 1104-2 are generally referred to herein collectively as macro cells 1104 and individually as macro cell 1104. The cellular communications network 1100 may also include a number of low power nodes 1106-1 through 1106-4 controlling corresponding small cells 1108-1 through 1108-4. The low power nodes 1106-1 through 1106-4 can be small base stations (such as pico or femto base stations) or Remote Radio Heads (RRHs), or the like. Notably, while not illustrated, one or more of the small cells 1108-1 through 1108-4 may alternatively be provided by the base stations 1102. The low power nodes 1106-1 through 1106-4 are generally referred to herein collectively as low power nodes 1106 and individually as low power node 1106. Likewise, the small cells 1108-1 through 1108-4 are generally referred to herein collectively as small cells 1108 and individually as small cell 1108. The base stations 1102 (and optionally the low power nodes 1106) are connected to a core network 1110.

The base stations 1102 and the low power nodes 1106 provide service to wireless devices 1112-1 through 1112-5 in the corresponding cells 1104 and 1108. The wireless devices 1112-1 through 1112-5 are generally referred to herein collectively as wireless devices 1112 and individually as wireless device 1112. The wireless devices 1112 can be referred to herein as UEs.

Figure 20:
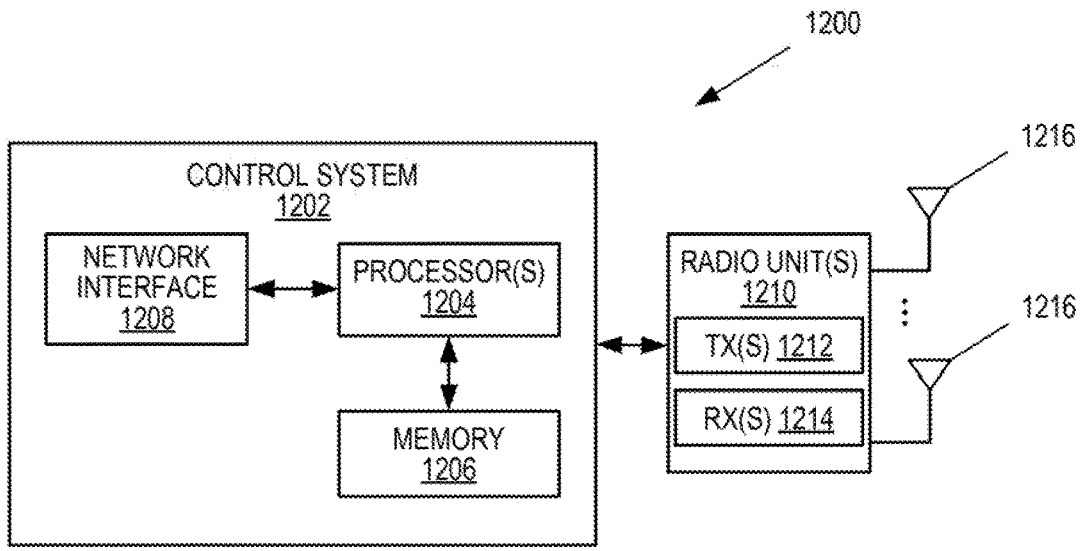
FIGS. 20 and 22 are block diagrams that illustrate a network node or IAB node according to an embodiment.

FIG. 20 is a schematic block diagram of a radio access node 1200 according to some embodiments. The radio access node 1200 may be, for example, a base station 1102 or 1106 or an IAB node. As illustrated, the radio access node 1200 includes a control system 1202 that includes one or more processors 1204 (e.g., Central Processing Units (CPUs), Application Specific Integrated Circuits (ASICs), Field Programmable Gate Arrays (FPGAs), and/or the like), memory 1206, and a network interface 1208. The one or more processors 1204 are also referred to herein as processing circuitry. In addition, the radio access node 1200 includes one or more radio units 1210 that each includes one or more transmitters 1212 and one or more receivers 1214 coupled to one or more antennas 1216. The radio units 1210 may be referred to or be part of radio interface circuitry. In some embodiments, the radio unit(s) 1210 is external to the control system 1202 and connected to the control system 1202 via, e.g., a wired connection (e.g., an optical cable). However, in some other embodiments, the radio unit(s) 1210 and potentially the antenna(s) 1216 are integrated together with the control system 1202. The one or more processors 1204 operate to provide one or more functions of a radio access node 1200, such as to perform methods 600, 620 and 640 of FIGS. 16, 17, and 18 respectively. For example, the function(s) are implemented in software that is stored, e.g., in the memory 1206 and executed by the one or more processors 1204.

Figure 21:
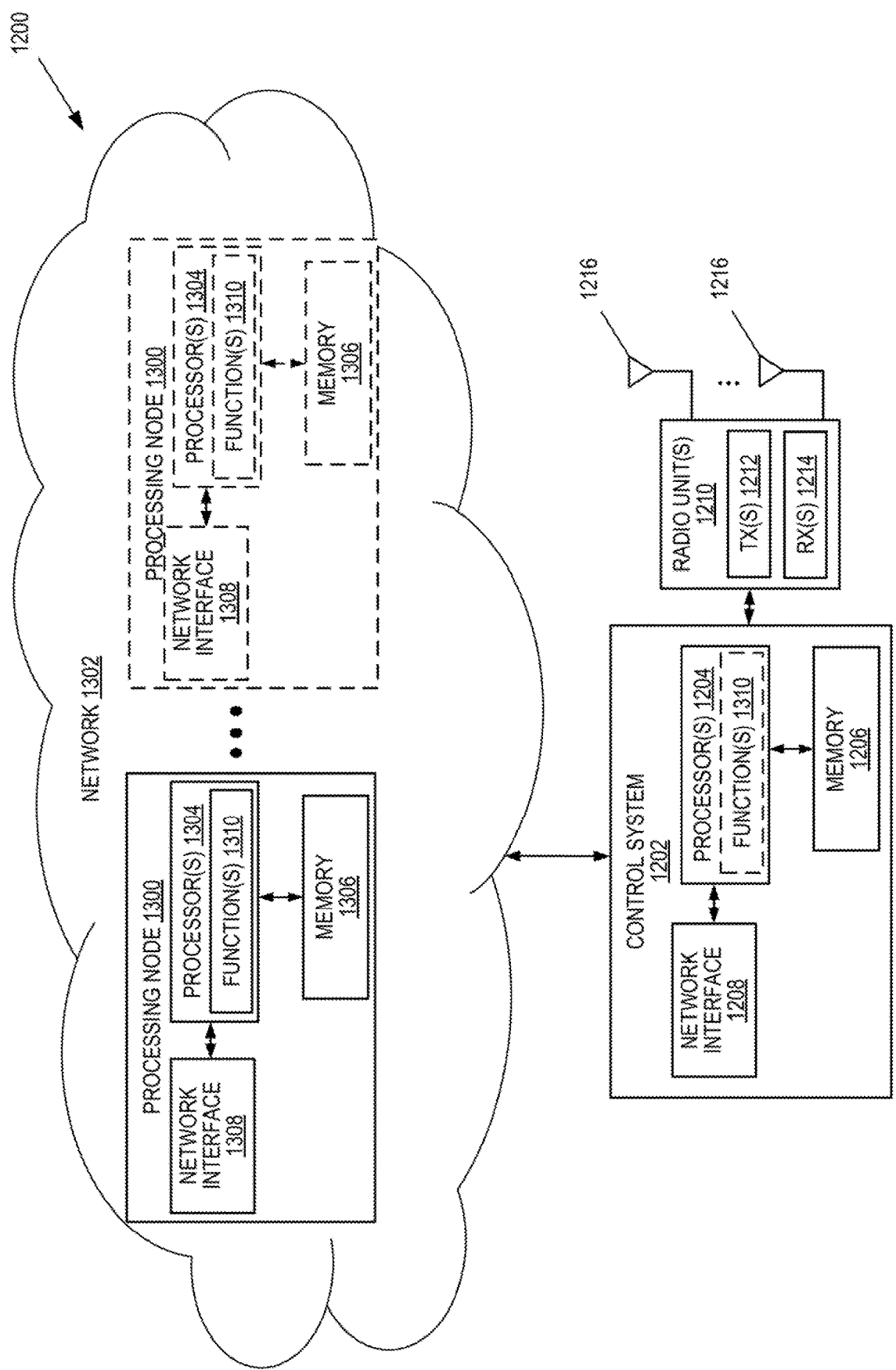
FIG. 21 illustrates a virtualized environment of a network node, according to some embodiments.

FIG. 21 is a schematic block diagram that illustrates a virtualized embodiment of the radio access node 1200 according to some embodiments. This discussion also applies to other types of network nodes.

As used herein, a "virtualized" radio access node is an implementation of the radio access node 1200 in which at least a portion of the functionality of the radio access node 1200 is implemented as a virtual component(s) (e.g., via a virtual machine(s) executing on a physical processing node(s) in a network(s)). As illustrated, in this example, the radio access node 1200 includes the control system 1202 that includes the one or more processors 1204 (e.g., CPUs, ASICs, FPGAs, and/or the like), the memory 1206, and the network interface 1208 and the one or more radio units 1210 that each includes the one or more transmitters 1212 and the one or more receivers 1214 coupled to the one or more antennas 1216, as described above. The control system 1202 is connected to the radio unit(s) 1210 via, for example, an optical cable or the like. The control system 1202 is connected to one or more processing nodes 1300 coupled to or included as part of a network(s) 1302 via the network interface 1208. Each processing node 1300 includes one or more processors 1304, memory 1306, and a network interface 1308.

In this example, functions 1310 of the radio access node 1200 described herein are implemented at the one or more processing nodes 1300 or distributed across the control system 1202 and the one or more processing nodes 1300 in any desired manner. In some embodiments, some or all of the functions 1310 of the radio access node 1200 described herein are implemented as virtual components executed by one or more virtual machines implemented in a virtual environment(s) hosted by the processing node(s) 1300. As will be appreciated by one of ordinary skill in the art, additional signaling or communication between the processing node(s) 1300 and the control system 1202 is used in order to carry out at least some of the desired functions 1310. Notably, in some embodiments, the control system 1202 may not be included, in which case the radio unit(s) 1210 communicate directly with the processing node(s) 1300 via an appropriate network interface(s).

In some embodiments, a computer program including instructions which, when executed by at least one processor, causes the at least one processor to carry out the functionality of radio access node 1200 or a node (e.g., a processing node 1300) implementing one or more of the functions 1310 of the radio access node 1200 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
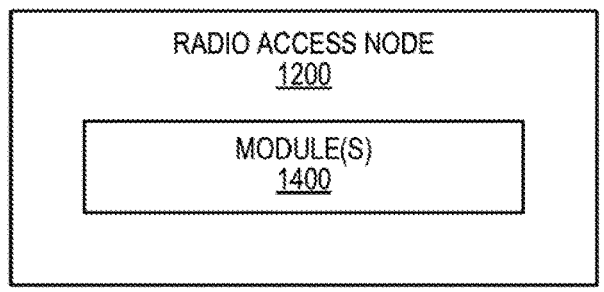

FIG. 22 is a schematic block diagram of the radio access node 1200 according to some other embodiments. The radio access node 1200 includes one or more modules 1400, each of which is implemented in software. The module(s) 1400 provide the functionality of the radio access node 1200 described herein. For example, the modules 1400 comprise a receiving module and a sending module operable to perform the steps of methods 600, 620 and 640 of FIGS. 16 to 18 respectively. This discussion is equally applicable to the processing node 1300 of FIG. 21 where the modules 1400 may be implemented at one of the processing nodes 1300 or distributed across multiple processing nodes 1300 and/or distributed across the processing node(s) 1300 and the control system 1202.

Figure 23:
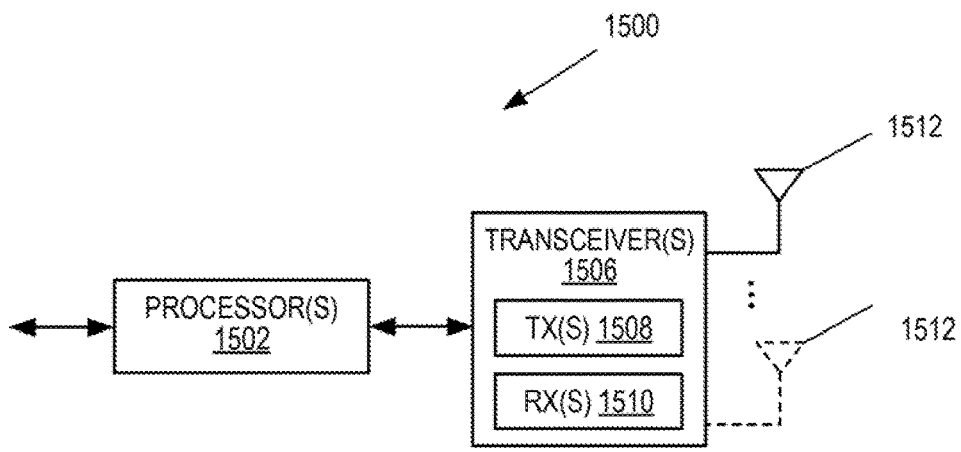
FIG. 23 is a block diagram that illustrate a wireless device.

FIG. 23 is a schematic block diagram of a UE 1500 according to some embodiments. As illustrated, the UE 1500 includes one or more processors 1502, memory 1504, and one or more transceivers 1506 each including one or more transmitters 1508 and one or more receivers 1510 coupled to one or more antennas 1512. The transceiver(s) 1506 includes radio-front end circuitry connected to the antenna(s) 1512 that is configured to condition signals communicated between the antenna(s) 1512 and the processor(s) 1502. The processors 1502 are also referred to herein as processing circuitry. The transceivers 1506 are also referred to herein as radio circuitry.

In some embodiments, a carrier comprising a computer program product is provided. The carrier is one of an electronic signal, an optical signal, a radio signal, or a computer readable storage medium (e.g., a non-transitory computer readable medium such as memory).

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

What is claimed is:

1. A method performed by an Integrated Access Backhaul (IAB) node for determining and sharing synchronization accuracy for a number of IAB nodes in a chain of IAB nodes communicatively coupled to each other, the method comprising:
   receiving, from each IAB node in the chain of IAB nodes, information about a synchronization error for each IAB node; and
   reporting an accumulated synchronization error to the respective IAB nodes in the chain of IAB nodes, in response to receiving the information about the synchronization error for each IAB node.

2. The method of claim 1, further comprising, based on the received information about the synchronization error for the IAB nodes, determining the accumulated synchronization error for each IAB node in the chain of IAB nodes.

3. The method of claim 1, wherein the synchronization error comprises an over the air-synchronization (OTA-S) timing error for the IAB.

4. The method of claim 2, wherein determining the accumulated synchronization error for each IAB node comprises determining an accumulated synchronization error based on a position of an IAB in the chain of IAB nodes.

5. The method of claim 4, wherein the accumulated synchronization error is determined based on:

$$T_{OTA-S0} + \sum_{i=1}^{X} T_{OTA-S\_i}$$

where $T_{OTA-S0}$ a sum of a synchronization source input error at a donor IAB node and an internal error at the donor IAB node, and $T_{OTA-S\_i}$ the OTA-S timing error for the i-th IAB node in the chain of IAB nodes.

6. The method of claim 1, wherein receiving the information about the synchronization error from each IAB node in the chain of the IAB nodes comprises receiving the information in a report.

7. The method of claim 6, wherein receiving the report is based on a periodic basis or event triggered.

8. The method of claim 7, wherein a frequency of the periodic report is a function of whether a donor IAB node is in holdover or the IAB node is in holdover.

9. The method of claim 8, wherein the donor IAB node is in holdover or the IAB node is in holdover, and the frequency of the periodic report is based on a change in a synchronization error of the donor IAB node or IAB node.

10. The method of claim 8, wherein the donor IAB node is in holdover or the IAB node is in holdover, and the frequency of the periodic report is based on a synchronization margin at one or more of the IAB nodes in the chain of IAB nodes.

11. The method of claim 1, further comprising notifying the IAB nodes in the chain if a donor IAB node is in holdover or the IAB node is in holdover.

12. The method of claim 1, wherein the synchronization error comprises one or more of: a timing error and a frequency stability of an oscillator.

13. A method performed by an Integrated Access Backhaul (IAB) node in a chain of IAB nodes communicatively coupled to a donor IAB node, the method comprising:
   sending to the donor IAB node, information about a synchronization error; and
   receiving an accumulated synchronization error for the IAB node, the accumulated synchronization error being based on at least the sent synchronization error.

14. The method of claim 13, further comprising determining the synchronization error.

15. The method of claim 13, wherein the synchronization error comprises an estimated OTA-S timing error for the IAB node.

16. The method of claim 13, wherein the accumulated synchronization error for the IAB node takes into account a position of the IAB node in the chain of IAB nodes.

17. The method of claim 13, further comprising estimating an available synchronization margin at the IAB node based on the accumulated synchronization error.

18. The method of claim 13, wherein sending the information about the synchronization error for the IAB node comprises sending the information in a periodic report or in response to an event trigger.

19. The method of claim 13, wherein the synchronization error comprises one or more of: a timing error and a frequency stability of an oscillator.

20. An Integrated Access Backhaul (IAB) node, comprising a network interface and a processing circuitry connected thereto, the processing circuitry configured to:
   receive, from each IAB node in a chain of IAB nodes, information about a synchronization error for each IAB node; and
   report an accumulated synchronization error to the respective IAB nodes in the chain of IAB nodes, in response to receiving the information about the synchronization error for each IAB node.

* * * * *